United States Patent
Cooper et al.

(10) Patent No.: US 6,596,055 B2
(45) Date of Patent: Jul. 22, 2003

(54) HYDROGEN STORAGE USING CARBON-METAL HYBRID COMPOSITIONS

(75) Inventors: Alan Charles Cooper, Macungie, PA (US); Guido Peter Pez, Allentown, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 09/988,084

(22) Filed: Nov. 19, 2001

(65) Prior Publication Data

US 2002/0096048 A1 Jul. 25, 2002

Related U.S. Application Data

(60) Provisional application No. 60/252,751, filed on Nov. 22, 2000.

(51) Int. Cl.$^7$ ............................ B01D 53/047; C01B 3/00
(52) U.S. Cl. ............................ 95/116; 95/106; 502/417; 420/900; 423/448
(58) Field of Search ............................ 95/116, 95, 96, 95/106, 115, 903; 206/0.7; 502/526, 417; 423/448, 645, 648.1; 420/900

(56) References Cited

U.S. PATENT DOCUMENTS

| | | | | |
|---|---|---|---|---|
| 4,580,404 A | * | 4/1986 | Pez et al. | 417/901 |
| 4,716,736 A | | 1/1988 | Schwarz | 62/48 |
| 5,653,951 A | | 8/1997 | Rodriguez et al. | 423/439 |
| 5,895,519 A | * | 4/1999 | Lorimer | 95/116 |
| 6,106,801 A | * | 8/2000 | Bogdanovic et al. | 252/182.35 |
| 6,159,538 A | * | 12/2000 | Rodriguez et al. | 420/900 |
| 6,290,753 B1 | * | 9/2001 | Maeland et al. | 206/7 |
| 2001/0016283 A1 | | 8/2001 | Shiraishi et al. | 429/218.2 |

OTHER PUBLICATIONS

A. Chambers, et al., *J. Phys. Chem B*, 102, "Hydrogen Storage in Graphite Nanofibers", pp. 4253–4256 (1998).
M. Rzepka, et al., *J. Pys Chem B*, 102, "Physisorption of Hydrogen on Microporous Carbon and Carbon Nanotubes", pp. 10894–10898, American Chemical Society (1998).
P. Chen, et al., *Science*, 285, "High $H_2$ Uptake by Alkali–Doped Carbon Nanotubes Under Ambient Pressure and Moderate Temperatures", pp. 91–93 (1999).
R. T. Yang, *Carbon*, 38; "Hydrogen Storage by Alkali–Doped Carbon Nanotubes—Revisited", pp. 623–626, Elsevier Science Ltd. (2000).
A. C. Dillon, et al. *Nature*, 386, "Storage of Hydrogen in Single–Walled Carbon Nanotubes", pp. 377–379 (1997).
Y. Ye, et al., *Applied Physics Letters*, 74, "Hydrogen Adsorption and Cohesive Energy of Single–Walled Carbon Nanotubes", pp. 2307–2309, American Institute of Physics (1999).
S. Bouaricha, *Journal of Alloys and Compounds*, 307, "Effect of Carbon–Containing Compounds on the Hydriding Behavior of Nanocrystalline $Mg_2Ni$", pp. 226–233, Elsevier Science S.A. (2000).
L. Aymard, et al., *Journal of The Electrochemical Society*, 146, "Effect of Carbon Additives on the Electrochemical Properties of $AB_5$ Graphite Composite Electrodes Prepared by Mechanical Milling", pp. 2015–2023, The Electrochemical Society, Inc. (1999).
K. Funaki, et al., *Journal of Alloys and Compounds*, 270, "Structural and Hydriding Properties of Amorphous MgNi With Interstitally Dissolved Carbon", pp. 160–163, Elsevier Science S.A. (1998).
G. Sandrock, *Journal of Alloys and Compounds*, 293–295, "A Panoramic Overview of Hydrogen Storage Alloys From a Gas Reaction Point of View", pp. 877–888, Elsevier Science S.A. (1999).
Imamura, et al., *International Journal Hydrogen Energy*, 25, "Hydriding–dehydriding Behavior of Magnesium composites Obtained by Mechanical Grinding With Graphite Carbon", pp. 837–843, (2000).
P. A. Sermon, et al., *Catalysis Reviews*, 8 (2), "Hydrogen Spillover", pp. 211–304, Marcel Dekker, Inc. (1973).
M.J. Heben, et al., *Mat. Res. Soc. Symp. Proc.*, 633, "Rapid, Room Temperature, High–Density Hydrogen Adsorption on Single–Walled Carbon Nanotubes at Atmospheric Pressure Assisted by a Metal Alloy", pp. A9.1.1–A9.1.11, Materials Research Society (2001).
A. C. Dillon, et al., Proceedings of the 1999 DOE/NREL Hydrogen Program Review, "Carbon Nanotube Materials for Hydrogen Storage", National Renewable Energy Laboratory (1999).

\* cited by examiner

*Primary Examiner*—Duane Smith
*Assistant Examiner*—Frank M. Lawrence
(74) *Attorney, Agent, or Firm*—Mark L. Rodgers

(57) ABSTRACT

A process is provided for the transport and storage of hydrogen by reversible sorption and containment within carbon-metal hybrid materials. The process comprises contacting a carbon-metal hybrid composition with a hydrogen-containing gas at conditions of temperature and pressure whereby the carbon-metal hybrid composition sorbs the hydrogen gas. The hydrogen that is sorbed in the carbon-metal composition is subsequently released by lowering the $H_2$ pressure and/or increasing the temperature to levels which cause desorption of the hydrogen gas.

18 Claims, 19 Drawing Sheets

HYDROGEN STORAGE USING CARBON-METAL HYBRID COMPOSITIONS

CROSS-REFERENCE TO RELATED APPLICATIONS

The present application is a continuation-in-part of Provisional Patent Application No. 60/252,751 filed Nov. 22, 2000.

BACKGROUND OF THE INVENTION

Hydrogen is a widely used commodity in the chemical and petroleum processing industries. Typically it is manufactured, usually by a reforming of natural gas, and is delivered to the users' sites by pipeline, as liquid $H_2$ or as the highly compressed gas in cylinders. The transport of hydrogen as a cryogenic liquid or as compressed gas are capital and energy-intensive processes which result in a significantly higher cost for the delivered gas. Therefore, there has been a large research effort directed at finding lower cost alternatives, principally on developing materials that could effectively "capture" hydrogen at or near ambient conditions and release the gas as desired, at the point of use. Recently such efforts have been greatly stimulated by the emerging technology of $H_2$-driven fuel cells which, for mobile systems, ideally require a safe and cost-effective means for an on-board storage of hydrogen.

Most of the research towards ways to "contain" hydrogen has focused on the reversible chemical reaction and absorption of $H_2$ by various metals and metal alloys to form metal hydrides. Representative systems are $LaNi_5$, FeTi and various magnesium-rich alloys, such as $Mg_2Ni$ and $Mg_2Fe$.

In general, the hydride-forming metals/alloys that demonstrate favorable thermodynamic properties display poor $H_2$ capacity, whereas hydride-forming metals/alloys with a relatively high $H_2$ capacity generally have unfavorable thermodynamic properties. While substantial research efforts have been focused upon the synthesis and study of new generations of bi-, tri-, and multi-metallic alloys that demonstrate incremental improvements in hydrogen capacity and adsorption/desorption kinetics, it can be argued that the art has reached a point of diminishing returns with respect to advancing the functional characteristics of these systems, casting doubt on their commercial viability and application at a large scale for $H_2$ storage.

The sorption of hydrogen by various new structural forms of carbon has recently gained widespread attention. It has been known for some time that high-surface-area activated carbon and also certain alkali-metal graphite intercalation compounds will reversibly sorb considerable quantities of hydrogen, but only at cryogenic temperatures. Such systems therefore do not offer practical or economic advantages over the use of compressed or liquified hydrogen. Rodriquez et al in U.S. Pat. No. 5,653,951 (1997) claim the storage of hydrogen in various layered carbon nanostructures including carbon nanofibers and carbon nanotubes. Hydrogen storage data is only given for carbon nanofiber materials which take up ~1.22 cc of $H_2$/gram at 295 K, 3.5 psia $H_2$ pressure. This corresponds to a uptake of only ca. 0.01 wt % $H_2$, a capacity which is far too small for any practical application. Bulk graphite, which has a surface area less than that of carbon nanofibers, would be expected to show an even smaller $H_2$ capacity.

Recently, Chambers, Rodriquez et al reported in *J. Phys. Chem B* 1998, 102, 4253 that carbon nanofiber materials of unspecified specific origin reversibly sorb very large, 50 wt % or greater, quantities of hydrogen under high $H_2$ pressure. These results have not been confirmed by others, and have been directly disputed in a number of publications. See Rzepka, M. et al, *J. Phys Chem B*, (1998) 102, 10894.

A. C. Dillon et al in *Nature* Vol. 386, p. 379 (1997) reported on an unusual sorption of hydrogen at near-ambient temperatures by single-walled carbon nanotube (SWNT) materials. The SWNT materials are relatively recently discovered new structural forms of carbon which essentially consist of rolled-up single sheets of graphite, with an external diameter of ca 12 Å and a very large length-to-diameter aspect ratio. The SWNT's are usually bundled together and appear by electron microscopy as long fibers which can be shortened and their properties otherwise modified by selective oxidation processes. SWNT materials are expected to adsorb $H_2$ at low (cryogenic) temperatures, analogous to activated carbons, due to their high surface area. However, the ambient-temperature $H_2$ sorption results of Dillon et al have been directly disputed in a recent publication by Ye, Y., et al, *Appl. Phys Lett.* (1999) 74, 2307.

L. Aymard, et al, *J. Electrochem. Soc.* (1999) 146, 2015 reported that carbon additives have been shown to have a favorable effect on the electrochemical performance of multi-metal alloys for nickel-metal hydride batteries. Here, carbon is incorporated interstitially in the alloy electrode where inter alia, it aids in the diffusion of hydrogen into the bulk of the alloy. K. Funaki, et al., *J. Alloys Comp.* (1998) 270, 160 have shown that the introduction of graphite by mechanical alloying into MgNi, a well-known metal hydride forming composition, yields alloy compositions of formula $MgNiC_x$ where $x \leq 1.31$. Upon hydrogenation of $MgNiC_x$ the atomic ratio of hydrogen plus carbon to metal, (H+C)/M, remains constant indicating that the hydride sites in the metal alloy are simply replaced by carbon atoms. Thus, there is no evident increase in hydrogen storage capacity. G. Sandrock, *J. Alloys Comp.* (1999) 293–95, 877 reports that the addition of sulfur, selenium, and carbon, non-metal elements to, specifically, Ti—Mn Laves phase alloys is reported to "pave the way" for increasing the $H_2$ storage capacity of these alloys.

In U.S. Pat. No. 4,716,736 (1988) J. A. Schwartz teaches "metal assisted cold storage of hydrogen". Here the well-known capability of activated high surface area microporous (not substantially graphitic) carbons to physically adsorb $H_2$ at cryogenic temperatures is said to be somewhat enhanced by the presence of an added highly dispersed transition metal, eg Pd, Pt, component. The utility of this system is however, restricted to cryogenic temperatures, ie, at less than 273 K; Examples provided are at 77 K and 85 K. It is theorized here that the $H_2$ molecule is adsorbed onto the metal as H atoms, (monatomic hydrogen), which "spills" onto the carbon surface, this activated hydrogen thus "filling the available sites on the activated carbon"—as physisorbed $H_2$.

The concept of hydrogen spillover, see "Hydrogen Spillover" by P. A. Sermon and G. C. Bond, *Cat Rev.* 8(2) 211 (1973) has its genesis in fundamental studies with supported metal catalysts, particularly with such systems as are used for chemical hydrogenation reactions. The metal has the role of "activating" hydrogen by reversibly dissociating $H_2$ into metal-H atom species on its surface. But it's has been observed that, for instance, by heating Pt dispersed on carbon catalysts (designated as Pt/C) at 623 K, $Pt/Al_2O_3$ at 473–573 K, Pd/C at 473 K, and also by $Pt/WO_3$, the amount of $H_2$ taken up is in excess of the known $H_2$-sorption capacity of the metal alone. Numerous studies have provided support for the theory that some of the $H_2$ "spills over" from the metal to the support but the nature of this "transferred" hydrogen is not presently known. The quantity of this hydrogen on the support is usually very small, amounting to only several atoms of H for every H that's bound to the metal.

N. Rodriguez and T. Baker, U.S. Pat. No. 6,159,538, provides further data on their prior literature report in *J. Phys. Chem* B 1998, 108, 4253 of $H_2$-uptake by layered nanostructures which include graphite, carbon nanofibers, multi-walled carbon nanotubes etc., that have been treated with an inert gas at elevated temperatures. The $H_2$ absorption is claimed to take place when the materials are subjected to flowing hydrogen at a pressure from 1000 psia to 3000 psia. The patent describes a use of a nanostructure that is intercalated with a minor amount of a suitable metal, which serves to increase the gap between the nanomaterial's layers.

BRIEF SUMMARY OF THE INVENTION

The present invention is a process for the transport and storage of hydrogen by reversible sorption and containment within carbon-metal hybrid materials. The process comprises contacting a carbon-metal hybrid composition with a hydrogen-containing gas at a maintained pressure of from about 14 psia to about 2000 psia, preferably 20 to 500 psia, and a temperature from about 253 K to 473 K, and preferably from 273 K to 328 K, whereby the carbon-metal hybrid composition sorbs and thereby stores the hydrogen gas. The hydrogen that is sorbed in the carbon-metal composition is subsequently released by lowering the $H_2$ pressure to from 1 psia to 200 psia, preferably from 14 to 50 psia, and/or increasing the temperature to from 273 K to 573 K, preferably from 293 K to 363 K.

The process of the present invention operates to reversibly sorb hydrogen due to the specific reaction conditions set out above along with the careful selection of particular carbon-metal hybrid materials. Under the claimed process conditions, the carbon-metal hybrid materials of the present invention display an $H_2$ sorption capacity that is greater than the sum of the capacities of the hybrid's individual components, and also allows for the hydrogen to be stored in the carbon-metal hybrid materials for an indefinite period of time in a vessel under at least the equilibrium partial pressure of hydrogen prior to being recovered by desorption.

DETAILED DESCRIPTION OF THE INVENTION

Figure 1:
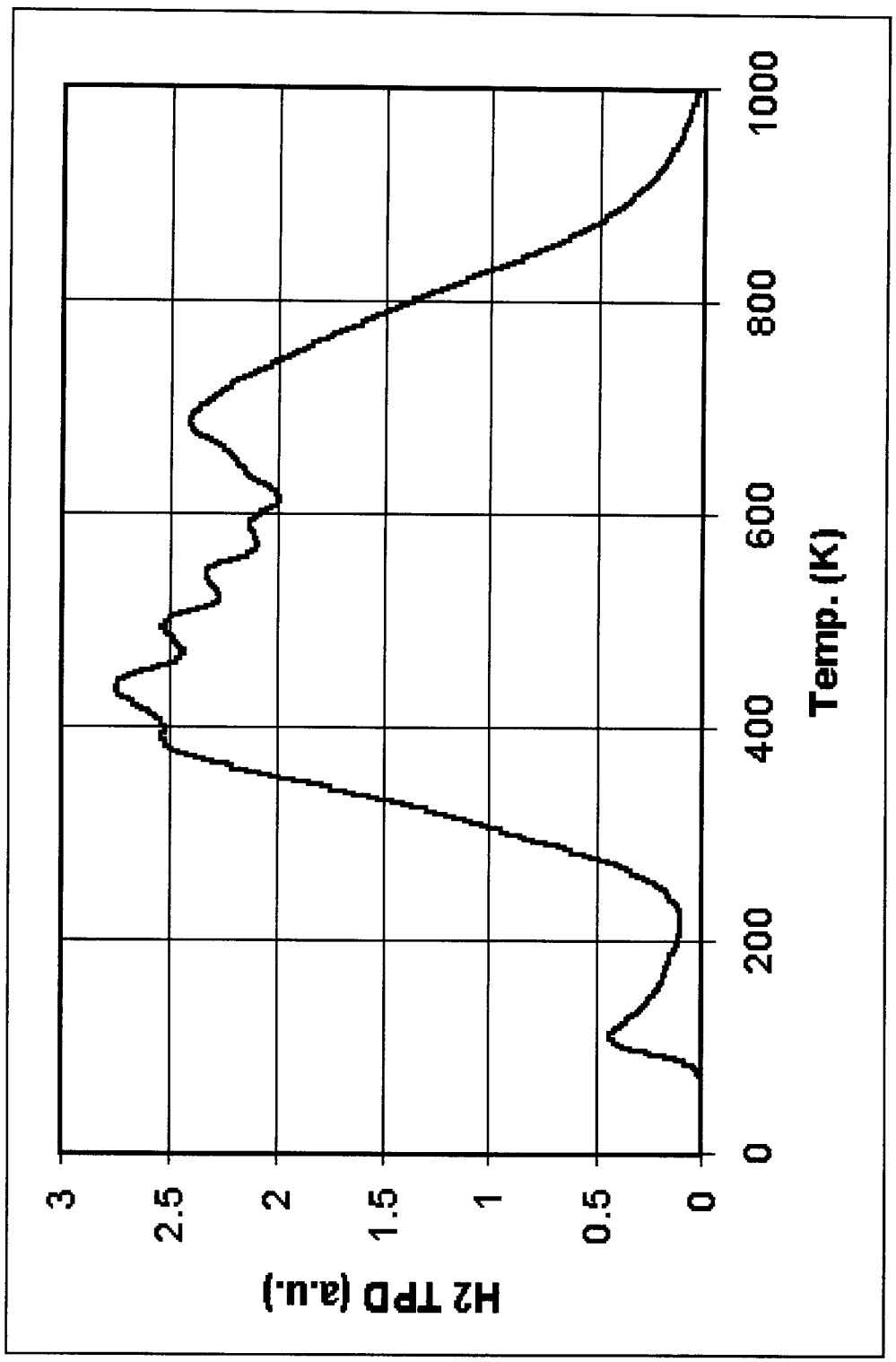
FIG. 1 is a plot of the temperature programmed desorption (TPD) of hydrogen from a sample (Example 1) of a hybrid composition of exfoliated graphite and 90% titanium/4% vanadium/6% aluminum alloy.

The present invention is a process which employs carbon-metal hybrid compositions as effective, reversible absorbents for hydrogen and serve as materials for a practical storage of the gas.

The carbon portion of the carbon-metal hybrid composition is a "substantially graphitic structure", preferably a single-sheet graphitic structure wherein "graphitic structure" is defined as a structure comprising a conjugated, unsaturated, all carbon, aromatic structure. Examples of suitable "substantially graphitic" carbons include, graphite itself, exfoliated graphite which consists of a loose assembly of single sheets of graphite, single wall carbon nanotubes and nanocones which are derived by appropriately "folding" single sheets of graphite, carbon nanocells, multi-wall carbon nanotubes which consists of concentric sheets of rolled-up graphite, carbon nanofibers which comprise small graphite sheets that are stacked in a direction that is either perpendicular or at an acute angle to the fiber's axis, mesoporous and microporous carbon microbeads, and carbon soot which has been substantially graphitized as shown by transmission electron microscopy.

The metal portion of the carbon metal hybrid composition should have the capability of reversibly reacting with hydrogen in the temperature and pressure ranges of the process. This reaction with hydrogen will usually be a process where there is a dissociation of the $H_2$ molecule with the reversible formation of either surface or bulk metal hydrides. The platinum group metals, ie. Pt, Pd, Ir, Rh, Ru and Os, and also Ni and Co, (all of which are metals of the Transition Series of elements) as well as alloys that comprise these metals, usually form surface hydrides and, at very high dispersions (extremely small sizes), exhibit an uptake of hydrogen that approaches about 1 H/metal atom. Of this group of elements, palladium can dissolve in its bulk considerable amounts of hydrogen with the formation of various hydride phases. Also useful are the earlier group metals of the Transition Series, i.e. Ti, Zr, Hf, V, Nb, Ta, and Cr and also alloys which include these metals, such as Ti/V, Ti/V/Al, Fe/Ti, Fe/Cr/Mn, Zr/Fe/Cr which can form bulk metal hydrides. Also included in this invention are hybrid materials of carbon and metal hydrides of the same aforementioned metals of the Transition Series of elements, where the metal or metal alloy combination has been hydrided by reaction with $H_2$ to form a bulk metal hydride prior to combination with the graphitic carbon. Examples are $LaNi_5H_6$, $CaNi_5H_6$, $MmNi_{3.5}Co_{0.7}Al_{0.8}H_x$ (Mm=Misch metal, a mixture of lanthanide group elements), $MmNi_{4.15}Fe_{0.85}H_x$; $TiMn_{1.4}V_{0.62}H_x$ and $Ti_{0.98}Zr_{0.02}V_{0.47}H_x$ as listed in the review by G. Sandrock in J. of Alloys and Compounds, 293 (1999) 877. The chosen metal hydrides or metal alloy should preferably be reversible with respect to the desorption and re-sorption of hydrogen thus providing in situ at process conditions the metal or metal alloy component of the carbon-metal hybrid.

The carbon-metal hybrids of this invention display a useful $H_2$ sorption-capacity as defined by the pressure and temperature swing absorption cycle, which is greater than the sum of the capacity of the individual components of the hybrid.

Said carbon-metal hybrids may be prepared by a number of different methods, such as by subjecting a physical admixture of the two or more components to relatively energetic processes such as a intimate mechanical grinding (e.g. ball-milling) or sonication in a ultrasonic energy field, where there is local thermal and compressive energy. The sonication is conducted in a liquid medium. The medium can have beneficial properties, acting as more than just a physical support for the suspended metal and carbon components. Thus, it can assist in comminuition, or in the case of graphite, assist in exfoliation, or it can act as a chemical source of hydrogen. Typically the grinding is conducted in an inert atmosphere, in the presence of hydrogen, or in the presence of a chemical source of hydrogen. During the grinding, the graphitic carbon is not intended to act solely as a lubricant as taught in the art, but rather is incorporated into the resultant carbon-metal hybrid composition.

Alternatively, a carbon-metal hybrid composition may be formed using chemical vapor deposition (CVD) of the carbon and/or the metal(s). Carbon-containing gases, including, but not limited to, methane, ethylene, and acetylene, may be decomposed thermally, with microwave plasma, or with laser energy, with or without the participation of various metal catalysts, to form substantially graphitic carbon materials. The metal component(s) of the metal-carbon hybrid may be used as the catalyst for decomposition of the carbon-containing gases. The metal(s) may also be introduced by CVD of volatile metal compounds concomitant to graphitic carbon formation, or deposited upon the previously formed graphitic structure.

Additionally, solution processing methods may be used to form metal-carbon hybrid compositions. An aqueous or organic solution of a salt or compound of the desired metal or metals may be introduced to the graphitic carbon by simple stirring and/or heating in solution. The graphitic carbons, separated from the metal salt solution, may be reduced by heating under reduced pressure, under a inert atmosphere, or under a reducing atmosphere, e.g. hydrogen, methane.

The resulting carbon-metal hybrid compositions will contain a bulk concentration of metal, or metal alloy, which comprises 1–80% (w/w) of the metal-carbon composition and are substantially free of metal carbide domains or carbon atoms in interstitial sites of the crystalline metal lattice. The balance of the hybrid composition will be formed of carbon materials that are substantially graphitic in structure. The two key requirements are that the carbon have a substantially graphitic structure and that the metal, with which the carbon must be in intimate contact, be capable of reversibly reacting with hydrogen at the process conditions of temperature and $H_2$ pressure. The reaction of $H_2$ with the metal may be either a surface reaction of the gas with small metal particles or a reaction that leads to the formation of a bulk metal hydride.

While not desiring to be bound to a specific theory, one potential mechanism for this reversible incorporation of $H_2$ is the phenomenon of "$H_2$-spillover" as described by P. A. Sermon, et al as described above. This mechanism involves a dissociative adsorption of hydrogen as atoms on the metal surface which then "spill" over onto the support.

A second and more definitive possible mechanism for our $H_2$-reactive carbon-metal systems is one where the graphitic carbon actually undergoes a metal-catalyzed chemical hydrogenation, converting its graphitic conjugated or aromatic system (where the carbon atoms are substantially $sp^2$ hybridized) to a substantially saturated structure where one H-atom has been added to every carbon, which now has an $sp^3$ hybridized electronic structure. The prototypical example is the hydrogenation of graphite, with the addition of 1H to every C atom, ie from $C_n$ to $(C—H)_n$. Calculations by high-level ab initio quantum mechanics methods, using VASP (Vienna Ab initio Simulation Package) and DMol (Molecular Simulation Inc. 1990, Version 4.6) predict for this hydrogenation of graphite energy changes of −7.3 kcal/mol $H_2$ and −8.5 kcal/mole $H_2$, respectively. Both values are suggestive of a favorable process, i.e. that a hydrogenated graphite will be more stable by 7.3 and 8.5 kcal/mole $H_2$ respectively, but not too stable to preclude its' being reversible by heating. For comparison, the heat of hydrogenation of benzene to cyclohexane at 298 K (a process which is not easily reversed by mild heating) is −16.3 kcal/mole $H_2$. We are not aware of any reports of such a catalytic hydrogenation of graphite. However, a chemical non-catalytic reduction of graphite and also of carbon nanotubes by their reaction with lithium metal in liquid ammonia has been recently announced by S. Pekker, J.P. Salvetat, E. Jakab, J. M. Bonard and L. Forro, *J. Phys. Chem B;* 2001; 105(33); 7938–7943.

The carbon-metal hybrid compositions described herein are useful for the reversible storage of hydrogen. A specific process for reversibly storing and releasing hydrogen incorporates a suitable storage vessel, containing the metal-carbon hybrid composition. The vessel is designed to facilitate heat transfer to and from the solid contents. The vessel is connected to a vacuum-pump apparatus, a source of inert gas, and a source of pure, gaseous hydrogen wherein the hydrogen is delivered to the vessel at the desired pressure. The temperature of the vessel can be controlled by the use of standard cooling (e.g. cryogenic gas/liquid/solid or refrigeration) and heating (e.g. resistive electrical or heat transfer media) processes. The carbon-metal hybrid composition may be activated for hydrogen sorption by heating under vacuum or inert gas flow. Hydrogen is admitted to the storage vessel until a desired equilibrium pressure of gaseous hydrogen is present.

Typically, the contact time of the carbon-metal hybrid composition with the $H_2$ gas will be from about 0.5–120 minutes, although shorter or longer contact times may be desired depending upon the particular carbon-metal hybrid composition and specific reaction conditions used. Generally, under these conditions it may be expected that the carbon-metal hybrid composition will store between 0.1 and 10 wt. % hydrogen for an indefinite period of time under at least the equilibrium partial pressure of hydrogen.

Controlled discharge of the hydrogen from the vessel can be accomplished by lowering the equilibrium pressure of gaseous hydrogen in the vessel, feeding gaseous hydrogen from the vessel to the end use point, at a constant, near ambient vessel temperature. Alternatively, the vessel may be heated, resulting in an increase of the pressure of gaseous hydrogen which may be fed to the end use point, or in some instances, the hydrogen may be discharged by a combination of lowering the pressure and increasing the temperature. Upon partial/complete discharge of the stored hydrogen, the carbon-metal hybrid composition may be recharged by admitting hydrogen to the storage vessel, with heating/cooling to maintain the vessel at a desired temperature, until the desired equilibrium pressure of gaseous hydrogen is reformed. Re-activation of the carbon-metal hybrid composition, by heating under vacuum or inert gas flow, can be performed as necessary to maintain optimum performance.

In accordance with the general process steps set out above, in practice the storage or containment of $H_2$ may be conducted by (a) a $H_2$-pressure swing process, (b) a temperature-swing process or (c) a combination of the two.

Thus, for the pressure-swing process $H_2$ is admitted into the vessel containing the sorbent at from 14 psia to 2000 psia of $H_2$ partial pressure, preferably at 20 psia to 500 psia, and is desorbed at the same temperature but at a lower pressure, in the range from 1 psia to 200 psia, preferably from 14 psia to 50 psia.

For the temperature-swing process the $H_2$ is contacted with the sorbent at from 253 K to 473 K, preferably from 273 K to 323 K, and is desorbed at the same pressure but at a higher temperature, at from 273 K to 573 K, preferably from 293 K to 363 K.

More preferred is the combined pressure-temperature swing process, for which the sorption will be at a $H_2$ partial pressure of 14 psia to 2000 psi, preferably at 20 psia to 500 psia, a temperature of 253 K to 473 K, preferably from 273 K to 323 K; with desorption and $H_2$ recovery taking place at a $H_2$ partial pressure of from 1 psia to 200 psia, preferably from 14 psia to 50 psia, and a temperature of from 273 K to 573 K, preferably from 293 K to 363 K. But there may be conditions where the desorption will occur at pressures which are the same or higher than those at which the gas was admitted, but only if the desorption temperature is also significantly higher. Likewise, desorption could take place at the same or at a lower temperature than that for sorption if the pressure is now significantly lower than that of the initial $H_2$ uptake. The most favorable and preferred conditions for this temperature-pressure swing process will be where the $H_2$ sorption takes place at a combination of higher pressures and lower temperatures: ranging from 30 psia to 500 psia, and from 283 K to 323 K, with the subsequent $H_2$ recovery by desorption taking place at lower pressures and higher temperatures: ranging from 15 psia to 25 psia, and from 333 K to 363 K.

The following examples are presented to better illustrate the present invention and are not meant to be limiting.

EXAMPLE 1

Exfoliated Graphite+Ti/V/Al Alloy

A 20 mg sample of graphite (1–2 µm particle size, Aldrich) was suspended in 5.0 M nitric acid (50 mL). This suspension was sonicated, using a ½ in. immersion probe (Sonics and Materials, Inc., VC 750), for 16 hours at 288 K (the suspension was held in a jacketed glass vial, chilled water was continuously circulated through the jacket to moderate the temperature) and 50 W/cm² power. The resulting dark gray suspension was filtered (0.1 µm alumina filter) and washed with deionized water until the pH of the filtrate was >5. The gray solid was washed with acetone and dried under vacuum at 373 K for 2 hours. The weight after drying was 35 mg. Scanning electron microscopy of the solid indicated the presence of metal particles of ca. 1 µm diameter. These metal particles were not present in the graphite before sonication. The graphite particles were exfoliated into small (ca. 0.05×1×1 µm) plates of graphite during the sonication in nitric acid. Assuming a negligible loss of carbon during the sonication, the sample composition is estimated to be 43% (w/w) carbon, and 57% 90Ti/6Al/4V alloy. The sample was placed in a quartz cell, of known volume, fitted with a thermocouple that is in direct contact with the sample. The sample was activated at 1023 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at interval of one second, showing a decrease in pressure that corresponds to hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 15 minutes). A temperature programmed desorption (TPD) experiment was then conducted, using the following procedure: The sample was warmed, at a constant rate, from 77 K to ca. 1000 K. During this heating, the sample cell was under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 1) show the presence of hydrogen desorption at three temperatures. Hydrogen evolution is observed in the temperature range from 77–180 K. This is consistent with physisorbed hydrogen and suggests the presence of some micropores in the exfoliated graphite/metal hybrid. A second, substantial, peak for hydrogen evolution is observed in the temperature range of 240–500 K. This peak is not observed for either pure exfoliated graphite or pure 90Ti/6Al/4V alloy. A third peak for hydrogen evolution is recorded at ca. 750 K. This peak is entirely consistent with hydrogen desorption from 90Ti/6Al/4V alloy as it is similar to samples of pure 90Ti/6Al/4V alloy which have a particle size of ca. 1 μm diameter. No gases other than hydrogen were detected during the TPD experiment.

EXAMPLE 2

Mesoporous Carbon Microbeads+Ti/V/Al Alloy

Figure 2:
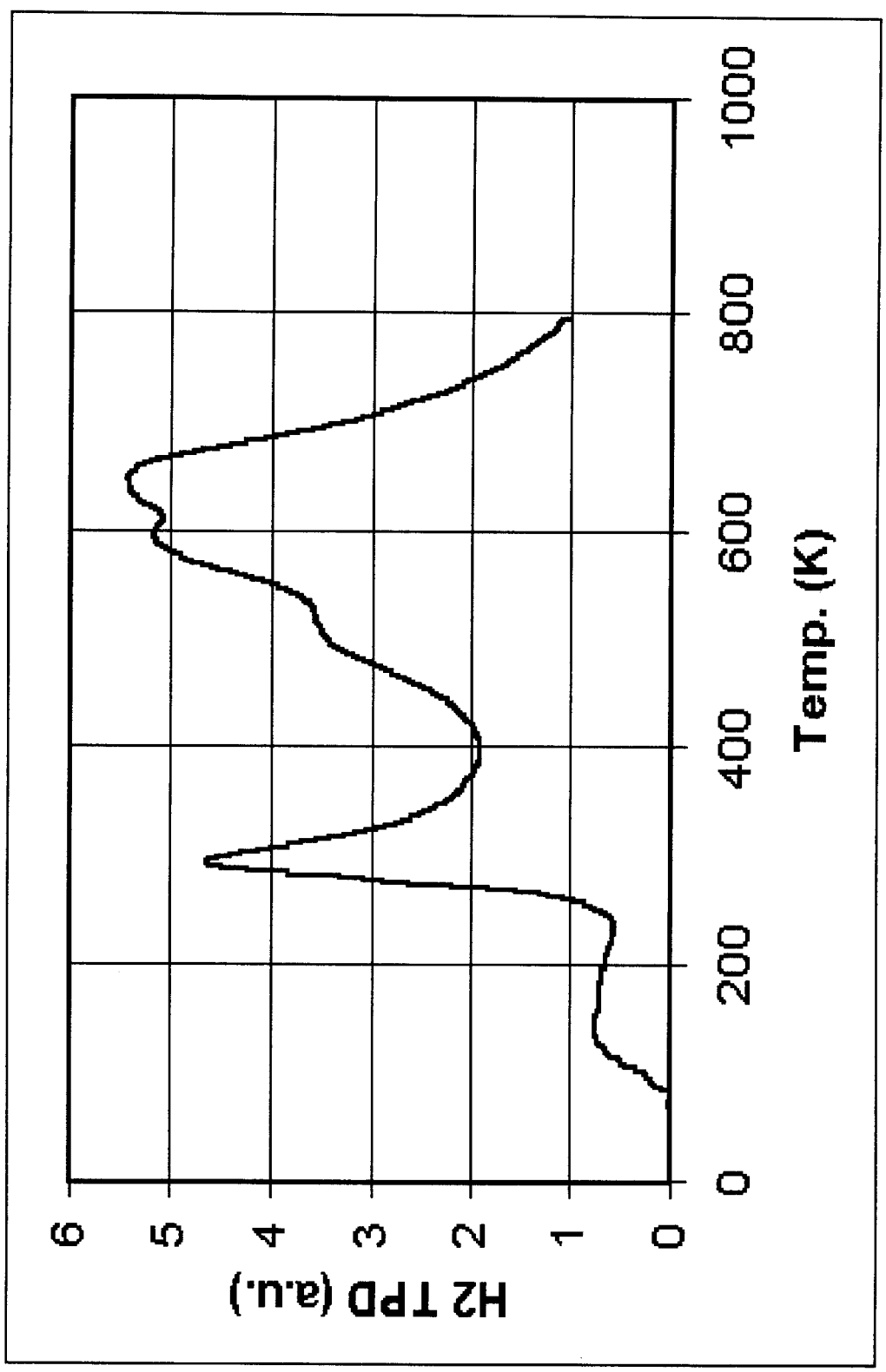
FIG. 2 is a plot of the temperature programmed desorption (TPD) of hydrogen from a sample (Example 2) of a hybrid composition of mesoporous carbon microbeads and 90% titanium/4% vanadium/6% aluminum alloy.
Figure 3:
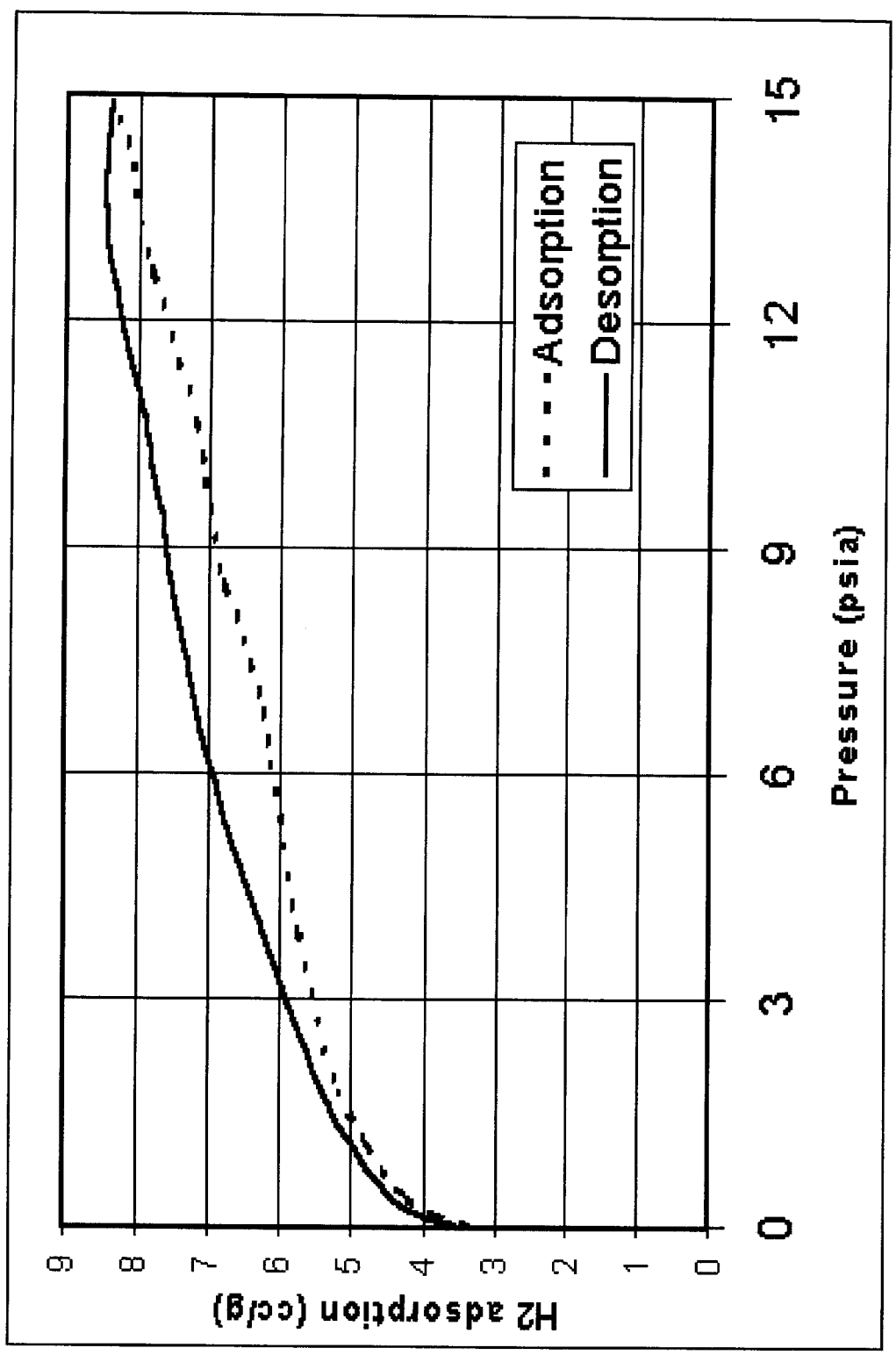
FIG. 3 is a plot of the adsorption/desorption isotherm cycle at 298 K of hydrogen on a sample (Example 2) of a hybrid composition of mesoporous carbon microbeads and 90% titanium/4% vanadium/6% aluminum alloy.

A 5 mg sample of mesoporous carbon microbeads (pore size ca. 80 nm) was suspended in 5.0 M nitric acid (50 mL). This suspension was sonicated, using a ½ in. immersion probe (Sonics and Materials, Inc., VC 750), for 16 hours at 288 K (the suspension was held in a jacketed glass vial, chilled water was continuously circulated through the jacket to moderate the temperature) and 50 W/cm$^2$ power. The resulting dark gray suspension was filtered (0.1 μm alumina filter) and washed with deionized water until the pH of the filtrate was >5. The gray solid was washed with acetone and dried under vacuum at 373 K for 2 hours. The weight after drying was 20 mg. Scanning electron microscopy of the solid indicated the presence of metal particles of ca. 1 μm diameter and small (ca. 100 nm diameter) carbon particles. These metal particles were not present in the carbon microbeads before sonication. The small carbon beads appear to coat the surface of the metal particle. Assuming a negligible loss of carbon during the sonication, the sample composition is estimated to be 25% (w/w) carbon, and 75% 90Ti/6Al/4V alloy. The sample was placed in a quartz cell, of known volume, fitted with a thermocouple that is in direct contact with the sample. The sample was activated at 1023 K under vacuum (1×10$^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 15 minutes). A temperature programmed desorption (TPD) experiment was then conducted, using the following procedure: The sample was warmed, at a constant rate, from 77 K to ca. 800 K. During this heating, the sample cell was under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 2) show the presence of hydrogen desorption at three temperatures. A small amount of hydrogen evolution is observed in the temperature range from 77–200 K. This is consistent with physisorbed hydrogen and suggests the presence of some micropores in the mesoporous carbon microbead-metal hybrid. A second, very sharp peak for hydrogen evolution is observed in the temperature range of 240–360 K. This peak is not observed for either pure mesoporous carbon microbeads or pure 90Ti/6Al/4V alloy. A third peak for hydrogen evolution is recorded at 500–700 K. This peak is entirely consistent with hydrogen desorption from 90Ti/6Al/4V alloy of particle diameter ca. 1 μm. No gases other than hydrogen were detected during the TPD experiment. An adsorption/desorption hydrogen isotherm cycle (FIG. 3) has been recorded at 298 K on the mesoporous carbon microbead-metal hybrid composition between the pressures of 0.03–14.9 psia, which demonstrates reversible hydrogen adsorption at near-ambient temperatures for this composition.

EXAMPLE 3

Multiwalled Carbon Nanotubes (MWNT)+Ti/V/Al Alloy

Figure 4:
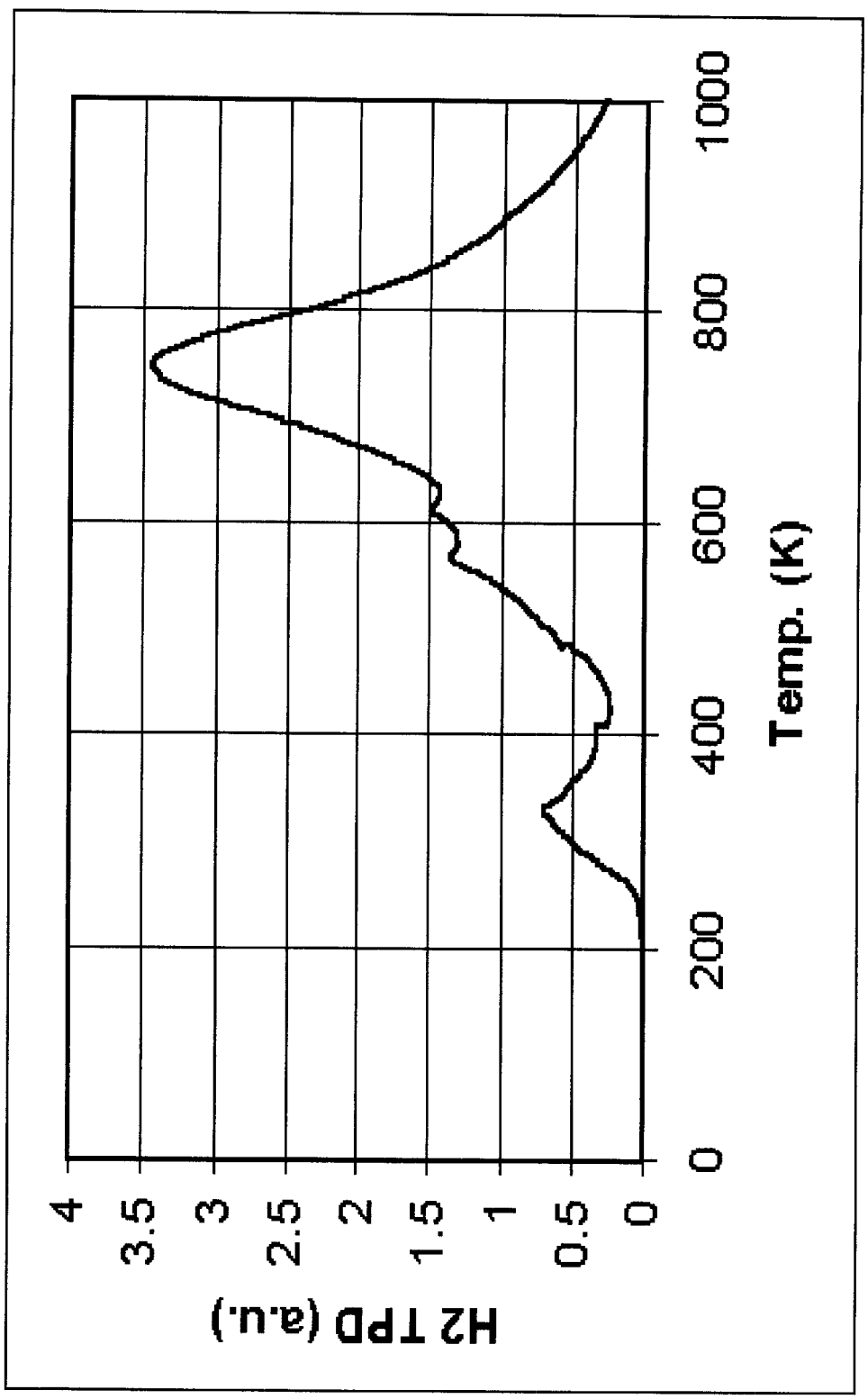
FIG. 4 is a plot of the temperature programmed desorption (TPD) of hydrogen from a sample (Example 3) of a hybrid composition of multiwalled carbon nanotubes and 90% titanium/4% vanadium/6% aluminum alloy.

A 25 mg sample of MWNT (−300 mesh, Materials and Electrochemical Research, Inc.) was suspended in 5.0 M nitric acid (50 mL). This suspension was sonicated, using a ½ in. immersion probe (Sonics and Materials, Inc., VC 750), for 16 hours at 288 K (the suspension was held in a jacketed glass vial, chilled water was continuously circulated through the jacket to moderate the temperature) and 50 W/cm$^2$ power. The resulting dark gray suspension was filtered (0.1 μm alumina filter) and washed with deionized water until the pH of the filtrate was >5. The gray solid was washed with acetone and dried under vacuum at 373 K for 2 hours. The weight after drying was 55 mg. Scanning electron microscopy of the solid indicated the presence of metal particles of ca. 1 μm diameter. These metal particles were not present in the MWNT before sonication. Assuming a negligible loss of carbon during the sonication, the sample composition is estimated to be 45% (w/w) carbon, and 55% 90Ti/6Al/4V alloy. The sample was placed in a quartz cell, of known volume, fitted with a thermocouple that is in direct contact with the sample. The sample was activated at 1023 K under vacuum (1×10$^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 195 K under the hydrogen atmosphere. While holding the sample at 195 K, the hydrogen was evacuated from the cell (total evacuation time of 10 minutes). A temperature programmed desorption (TPD) experiment was then conducted, using the following procedure: The sample was warmed, at a constant rate, from 195 K to ca. 1000 K. During this heating, the sample cell was under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 4) show the presence of hydrogen desorption at two temperatures. A peak for hydrogen evolution is observed in the temperature range of 240–380 K. This peak is not observed for either pure MWNT or pure 90Ti/6Al/4V alloy. A second peak for hydrogen evolution is recorded at 500–800 K. This peak is entirely consistent with hydrogen desorption from 90Ti/6Al/4V alloy of particle diameter ca. 1 μm. No gases other than hydrogen were detected during the TPD experiment.

EXAMPLE 4

Graphite Nanofibers+Ti/V/Al Alloy

Figure 5:
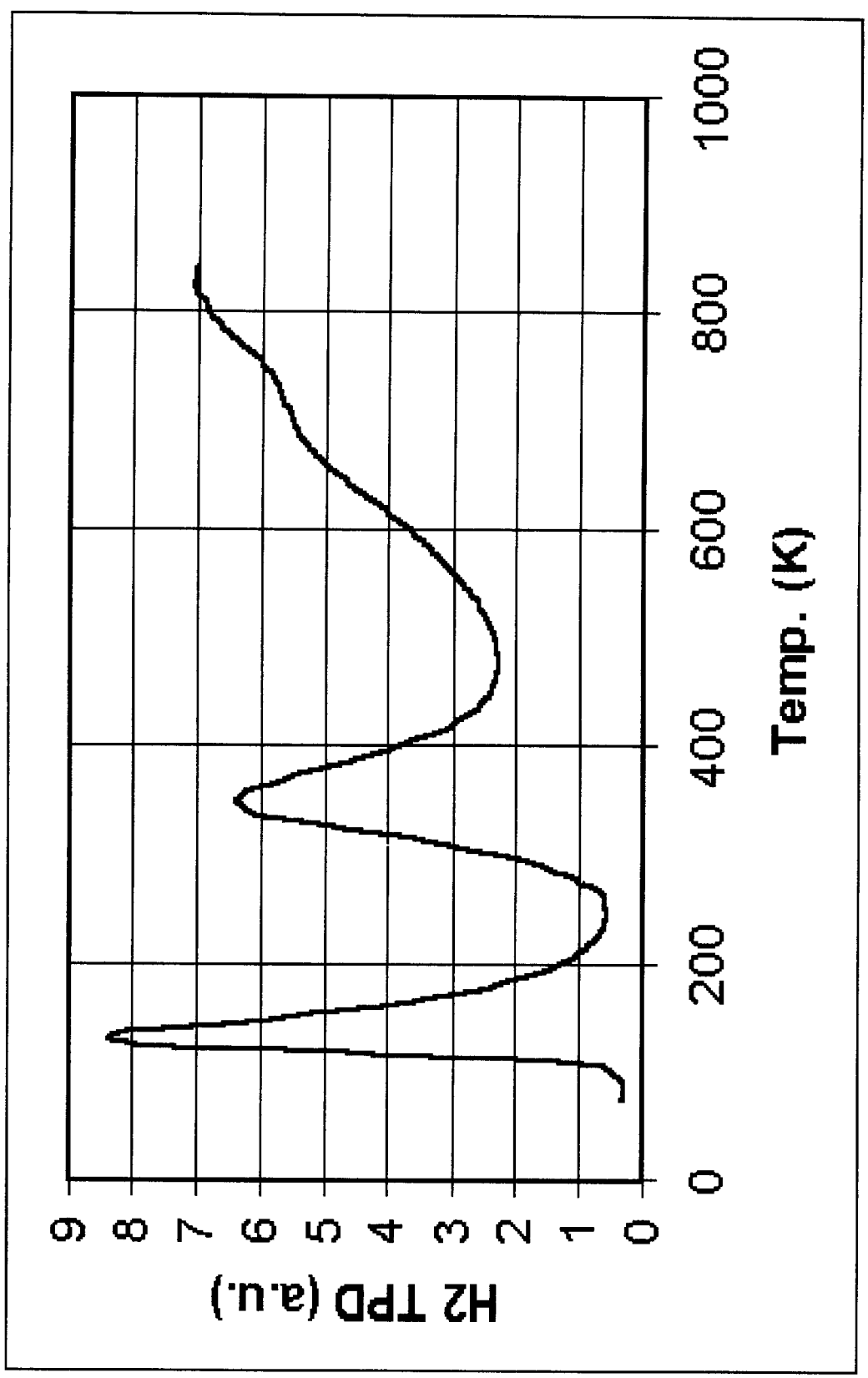
FIG. 5 is a plot of the temperature programmed desorption (TPD) of hydrogen from a sample (Example 4) of a hybrid composition of graphite nanofibers and 90% titanium/4% vanadium/6% aluminum alloy.
Figure 13:
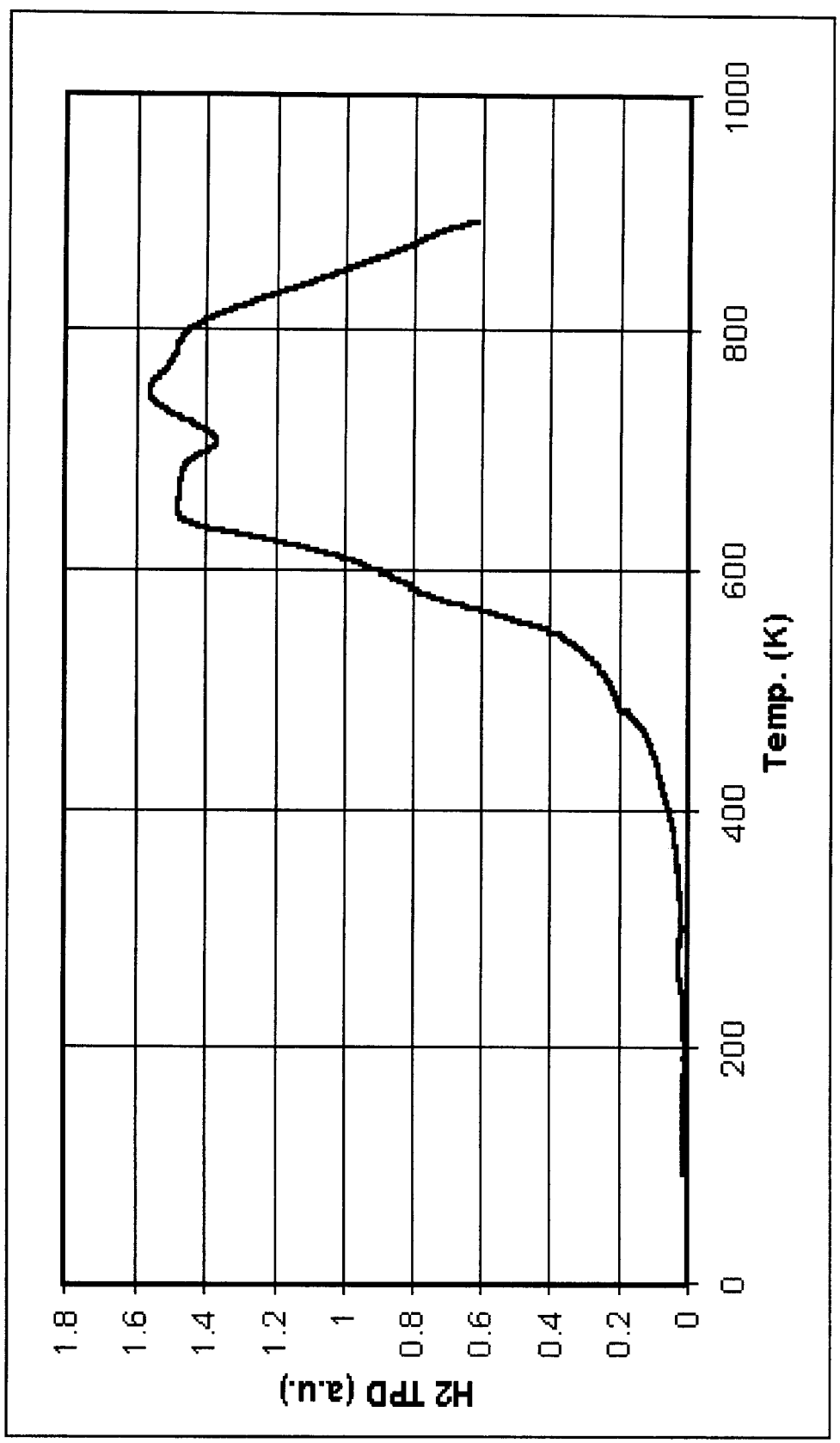
FIG. 13 is a plot of the temperature programmed desorption (TPD) of hydrogen from a sample (Comparative example 1) of 90% titanium/4% vanadium/6% aluminum alloy powder.
Figure 17:
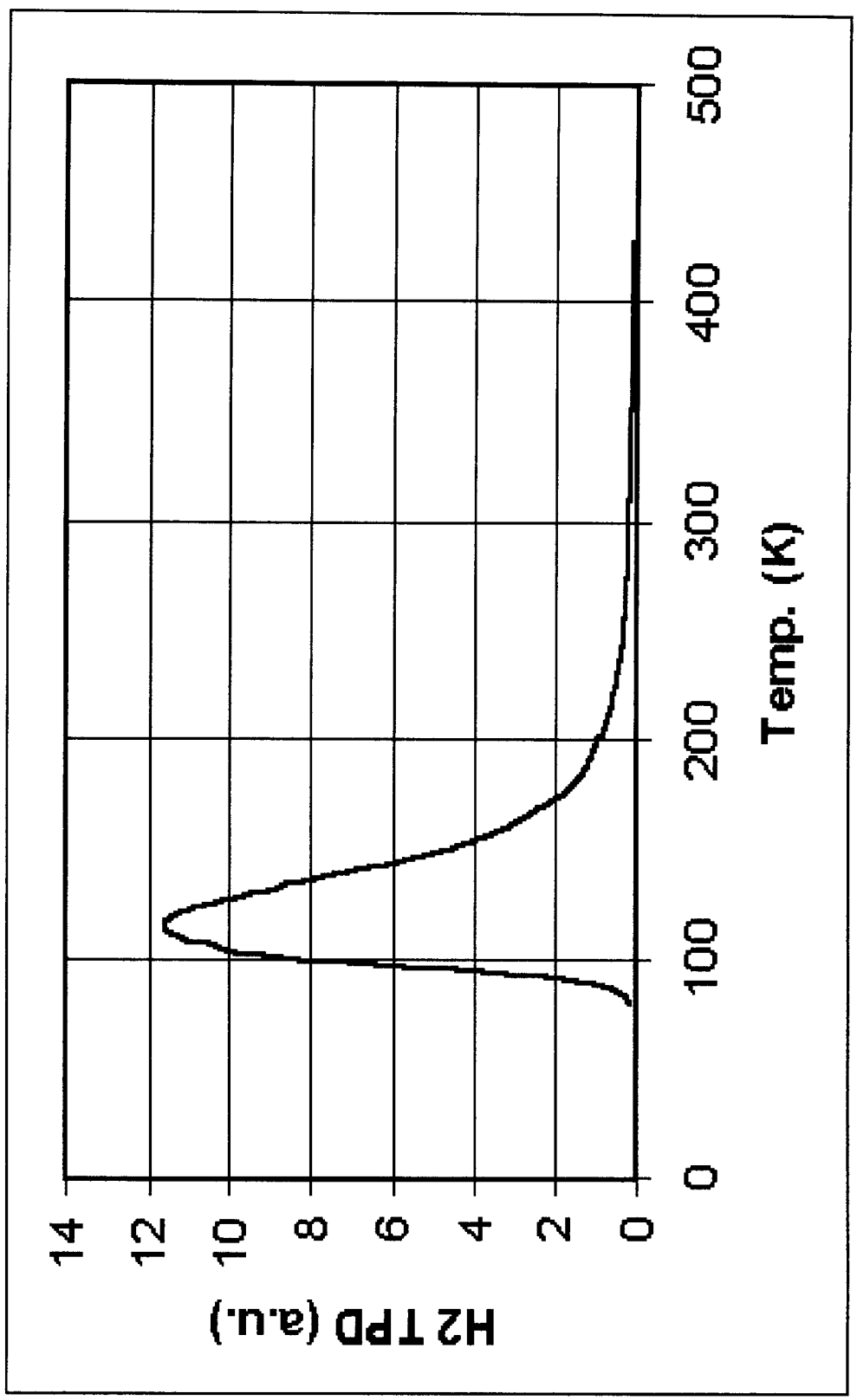
FIG. 17 is a plot of the temperature programmed desorption (TPD) of hydrogen from a sample (Comparative example 5) of mechanically milled graphite powder.

A 1.0 g sample of graphite nanofibers (150 nm diameter; 1 μm length) and 1.0 g of a 90Ti/6Al/4V alloy (Cerac, Inc.; −50 mesh) were placed in a 20 cc tungsten carbide grinding vial with four tungsten carbide grinding balls. This mixture was ball milled for 16 hours (Model 8000D; Spex, Inc.) at room temperature under argon atmosphere. The sample was removed from the tungsten carbide vial in an argon glovebox and a portion of the sample placed in a quartz cell, of known volume, fitted with a thermocouple that is in direct contact with the sample. The sample was activated at 1023 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 10 minutes). A temperature programmed desorption (TPD) experiment was then conducted, using the following procedure: The sample was warmed, at a constant rate, from 77 K to ca. 825 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 5) show the presence of hydrogen desorption at three temperatures. A peak for hydrogen adsorption is observed at ca. 77–200 K. This peak is commonly observed for graphite samples which have been ball milled in the absence of metal (see comparative example #5 and FIG. 17) and is due to the desorption of hydrogen which is physically adsorbed in microporous sites generated by the mechanical milling. A second peak for hydrogen evolution is observed in the temperature range of 250–400 K. This peak is not observed for either pure (metal-free) milled graphite or 90Ti/6Al/4V alloy. The third peak for hydrogen evolution is recorded at 500–800 K. This peak is entirely consistent with hydrogen desorption from 90Ti/6Al/4V alloy (see comparative example #1 and FIG. 13). A small amount of methane is co-evolved with this peak.

EXAMPLE 5

Graphite+Ti/V/Al Alloy

Figure 6:
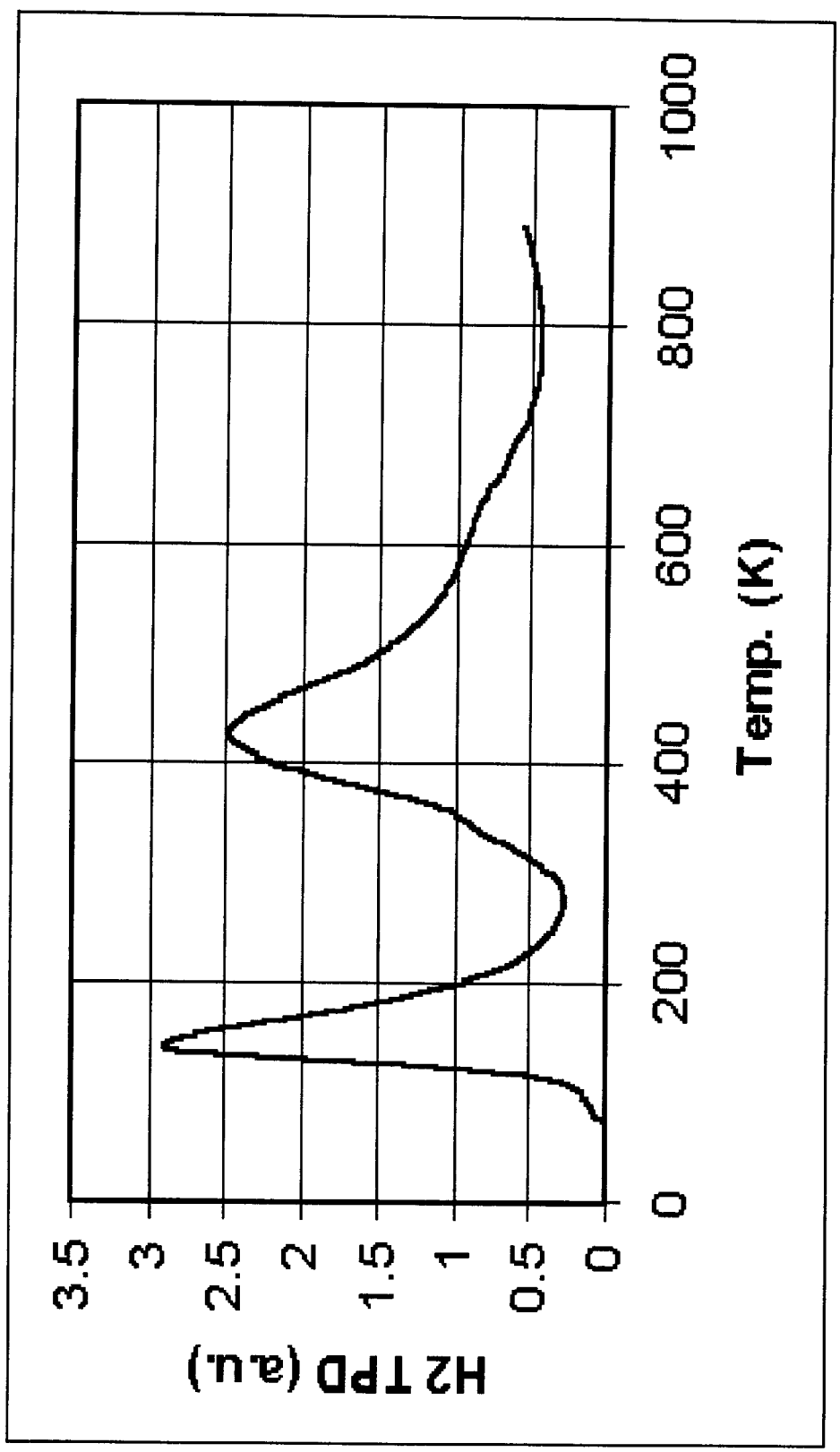
FIG. 6 is a plot of the temperature programmed desorption (TPD) of hydrogen from a sample (Example 5) of a hybrid composition of graphite and 90% titanium/4% vanadium/6% aluminum alloy.

A 1.0 g sample of graphite (Alfa Aesar; 2–15 μm particle size) and 1.0 g of a 90Ti/6Al/4V alloy (Cerac, Inc.; −50 mesh) were placed in a 20 cc tungsten carbide grinding vial with twelve tungsten carbide grinding balls. This mixture was ball milled for 1 hour (Pulverisette 7, Fritsch) at room temperature under argon atmosphere. The sample was removed from the tungsten carbide vial in an argon glovebox and a portion of the sample placed in a quartz cell, of known volume, fitted with a thermocouple that is in direct contact with the sample. The sample was activated at 1023 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 10 minutes). A temperature programmed desorption (TPD) experiment was then conducted, using the following procedure: The sample was warmed, at a constant rate, from 77 K to ca. 900 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 6) show the presence of hydrogen desorption in two temperature ranges. A peak for hydrogen adsorption is observed at ca. 77–200 K. This peak is commonly observed for graphite samples which have been ball milled in the absence of metal (see comparative example #5 and FIG. 17) and is due to the desorption of hydrogen which is physically adsorbed in microporous sites generated by the mechanical milling. A second peak for hydrogen evolution is observed in the temperature range of 300–450 K. This peak is not observed for either pure (metal-free) milled graphite or 90Ti/6Al/4V alloy.

EXAMPLE 6

Graphite Nanofibers+Titanium Metal

Figure 7:
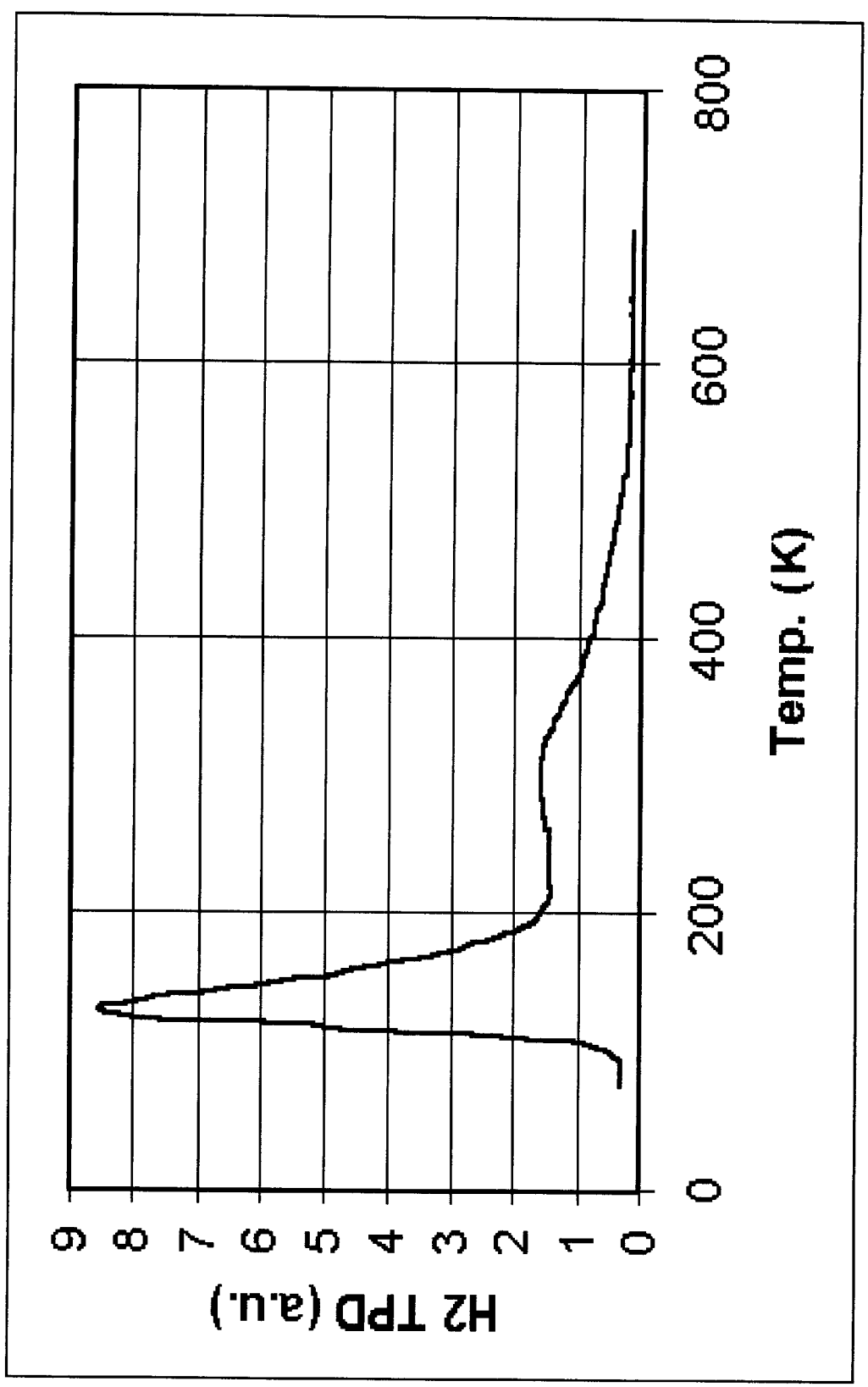
FIG. 7 is a plot of the temperature programmed desorption (TPD) of hydrogen from a sample (Example 6) of a hybrid composition of graphite nanofibers and titanium metal.
Figure 14:
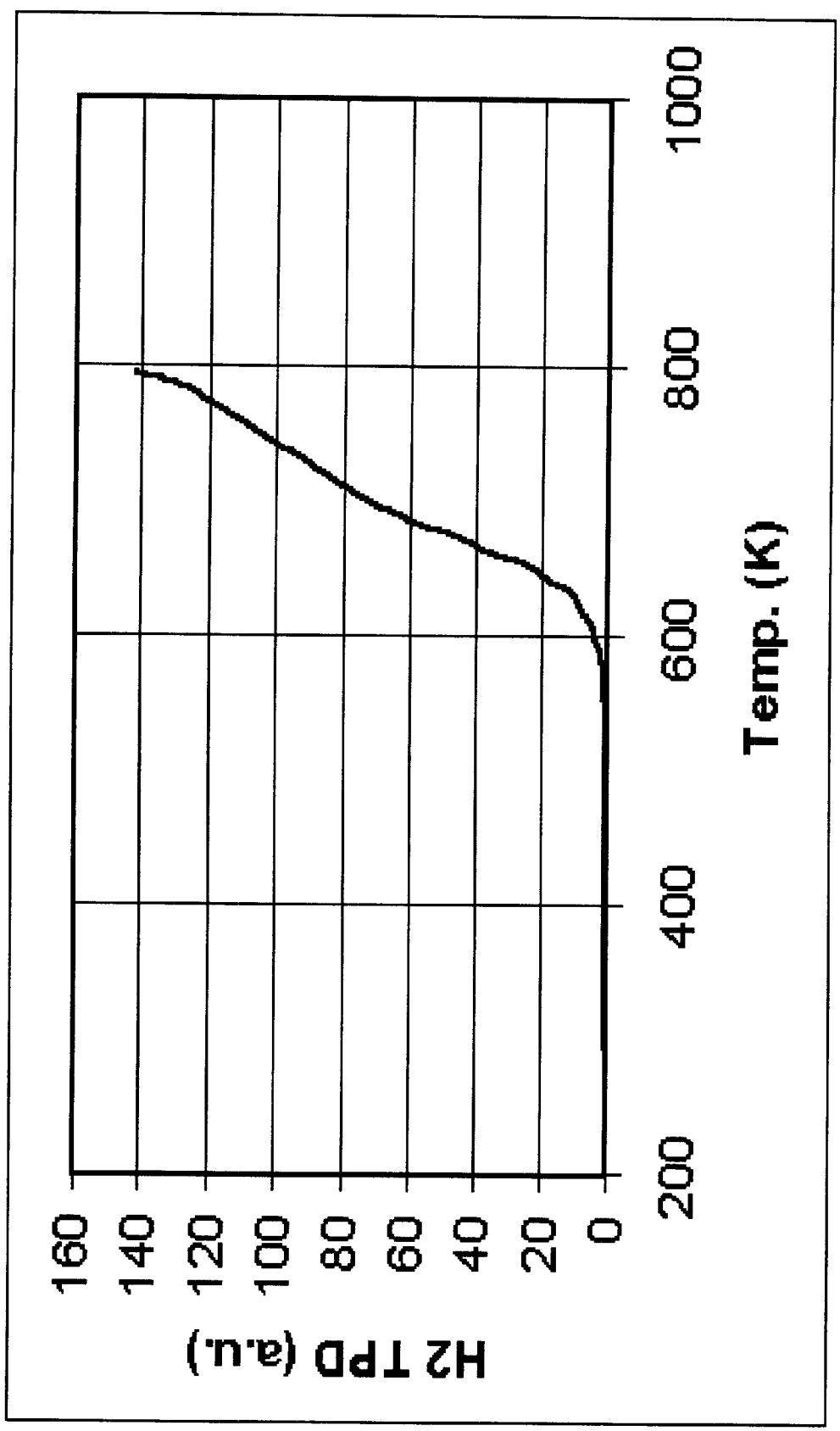
FIG. 14 is a plot of the temperature programmed desorption (TPD) of hydrogen from a sample (Comparative example 2) of titanium metal powder.

A 1.0 g sample of graphite nanofibers (150 nm diameter; 1 μm length) and 1.0 g of a titanium metal powder (Alfa Aesar; −325 mesh) were placed in a 20 cc tungsten carbide grinding vial with four tungsten carbide grinding balls. This mixture was ball milled for 20 hours (model 8000D; Spex, Inc.) at room temperature under argon atmosphere. The sample was removed from the tungsten carbide vial in an argon glovebox and a portion of the sample placed in a quartz cell, of known volume, fitted with a thermocouple that is in direct contact with the sample. The sample was activated at 573 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 500 torr. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 10 minutes). A temperature programmed desorption (TPD) experiment was then conducted, using the following procedure: The sample was warmed, at a constant rate, from 77 K to ca. 700 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 7) show the presence of hydrogen desorption at two temperatures. A peak for hydrogen adsorption is observed at ca. 77–200 K. This peak is commonly observed for graphite samples which have been ball milled in the absence of metal (see comparative example #5, FIG. 17) and is due to the desorption of hydrogen which is physically adsorbed in microporous sites generated by the mechanical milling. A second peak for hydrogen evolution is observed in the temperature range of 250–350 K. This peak is not observed for either pure (metal-free) milled graphite or titanium metal powder. The titanium metal powder (−325 mesh) shows a hydrogen desorption peak at temperatures >800 K (see comparative example #2, FIG. 14). Methane and carbon monoxide impurities are observed between 200–600 K.

EXAMPLE 7

Graphite Nanofibers+Vanadium Metal

Figure 8:
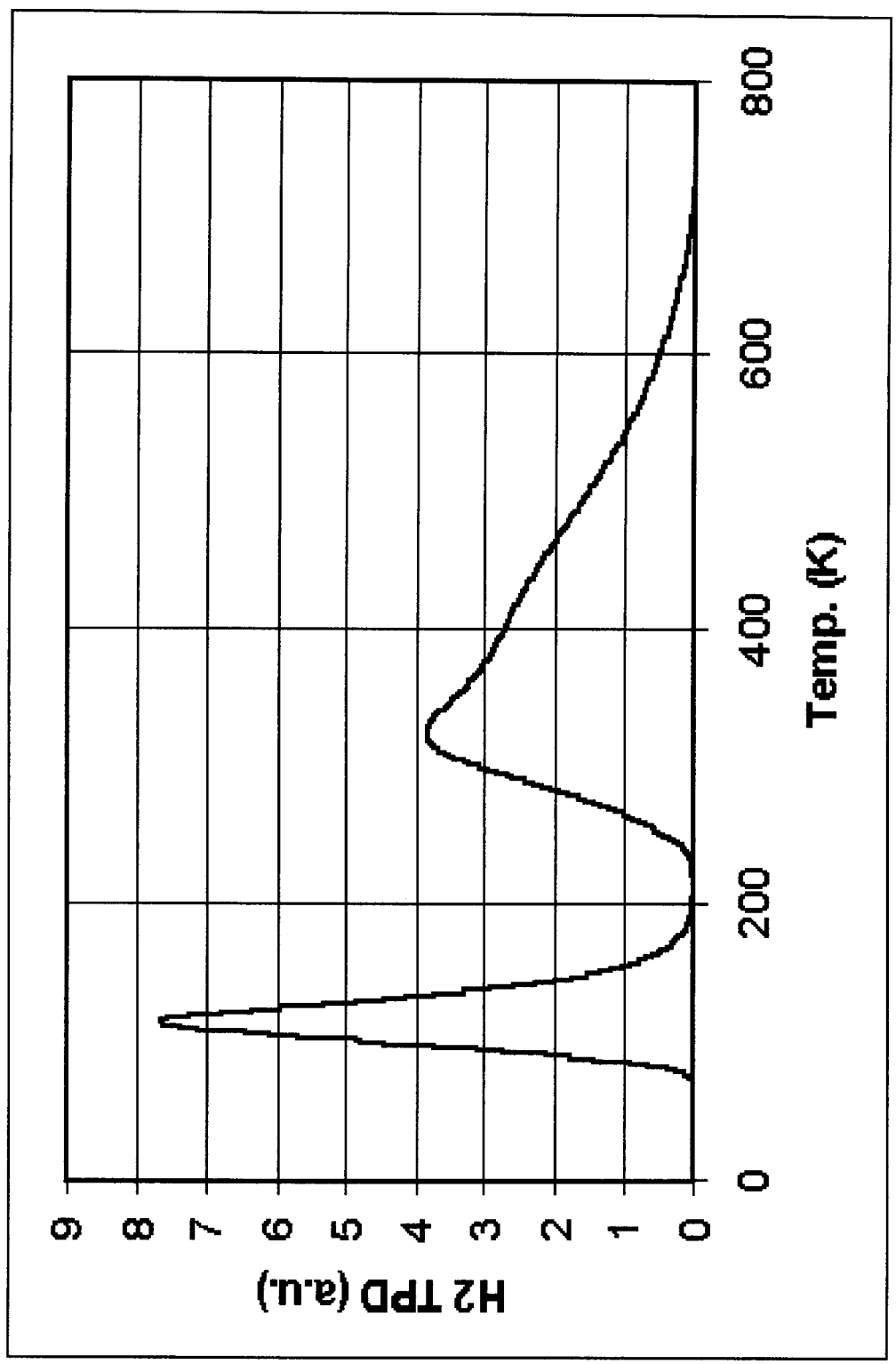
FIG. 8 is a plot of the temperature programmed desorption (TPD) of hydrogen from a sample (Example 7) of a hybrid composition of graphite nanofibers and vanadium metal.
Figure 15:
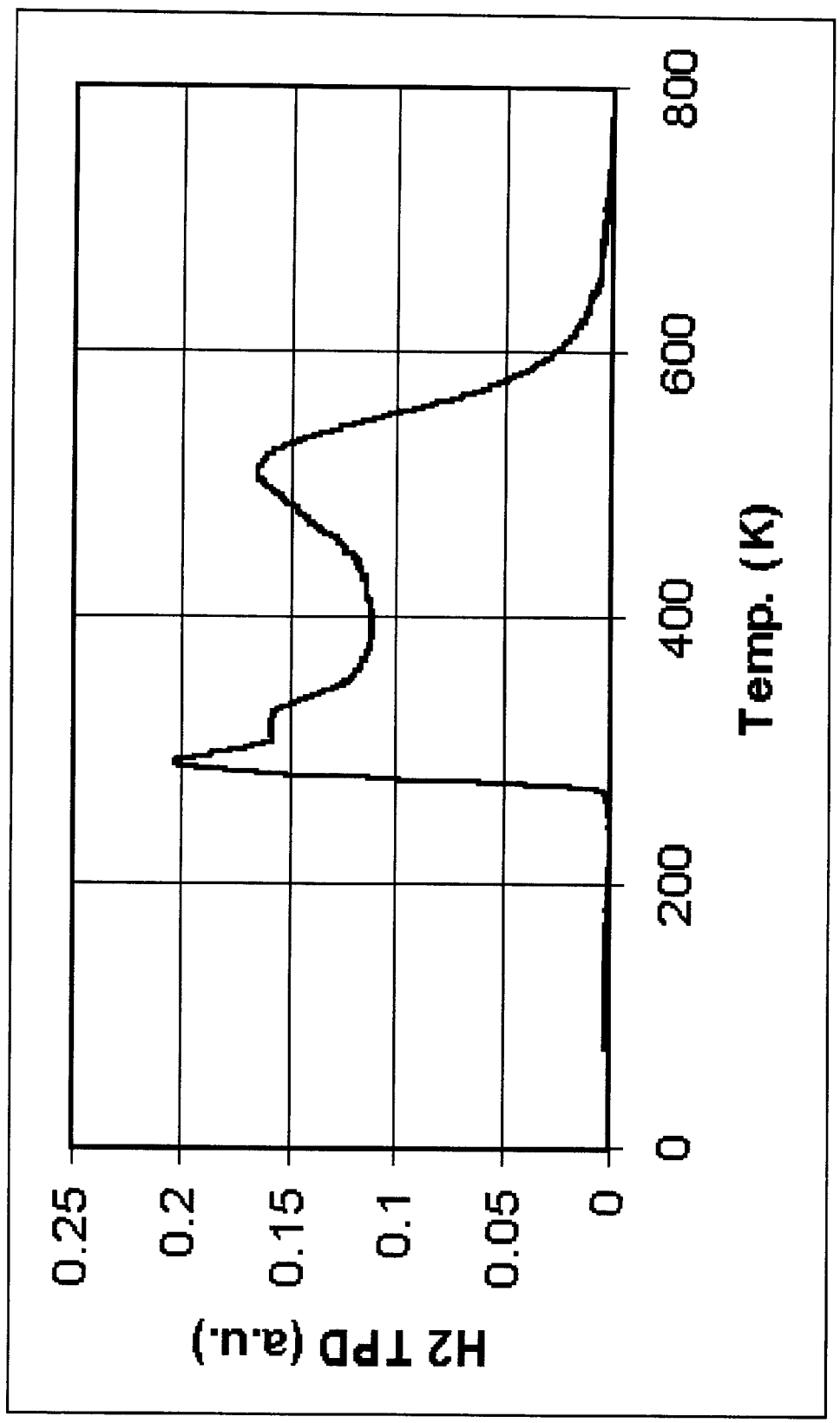
FIG. 15 is a plot of the temperature programmed desorption (TPD) of hydrogen from a sample (Comparative example 3) of vanadium metal powder.

A 1.0 g sample of graphite nanofibers (150 nm diameter; 1 $\mu$m length) and 1.0 g of a vanadium metal powder (Acros Organics; −200 mesh) were placed in a 20 cc tungsten carbide grinding vial with four tungsten carbide grinding balls. This mixture was ball milled for 18 hours (model 8000D; Spex, Inc.) at room temperature under argon atmosphere. The sample was removed from the tungsten carbide vial in an argon glovebox and a portion of the sample placed in a quartz cell, of known volume, fitted with a thermocouple that is in direct contact with the sample. The sample was activated at 1023 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 10 minutes). A temperature programmed desorption (TPD) experiment was then conducted, using the following procedure: The sample was warmed, at a constant rate, from 77 K to ca. 775 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 8) show the presence of hydrogen desorption at two temperatures. A peak for hydrogen adsorption is observed at ca. 77–200 K. This peak is commonly observed for graphite samples which have been ball milled in the absence of metal (see comparative example #5, FIG. 17) and is due to the desorption of hydrogen which is physically adsorbed in microporous sites generated by the mechanical milling. A second peak for hydrogen evolution is observed in the temperature range of 225–600 K. This peak is not observed for either pure (metal-free) milled graphite. The pure vanadium metal powder (−200 mesh) shows hydrogen desorption peaks at two temperatures 310 and 510 K (see comparative example #3, FIG. 15).

EXAMPLE 7(a)

Graphite Nanofibers+Vanadium Metal.

A 1.0 g sample of graphite nanofibers (150 nm diameter; 1 $\mu$m length) and 1.0 g of a vanadium metal powder (Acros Organics; −200 mesh) were placed in a 20 cc tungsten carbide grinding vial with four tungsten carbide grinding balls. This mixture was ball milled for 18 hours (model 8000D; Spex, Inc.) at room temperature under argon atmosphere. The sample was removed from the tungsten carbide vial in an argon glovebox and a portion of the sample placed in a quartz cell, of known volume, fitted with a thermocouple that is in direct contact with the sample. The sample was activated at 1023 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 10 minutes). A temperature programmed desorption (TPD) experiment was then conducted, using the following procedure: The sample was warmed, at a constant rate, from 77 K to ca. 775 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 8) show the presence of hydrogen desorption at two temperatures. A peak for hydrogen adsorption is observed at ca. 77–200 K. This peak is commonly observed for graphite samples which have been ball milled in the absence of metal (see comparative example #5, FIG. 17) and is due to the desorption of hydrogen which is physically adsorbed in microporous sites generated by the mechanical milling. A second peak for hydrogen evolution is observed in the temperature range of 225–600 K. This peak is not observed for either pure (metal-free) milled graphite. The pure vanadium metal powder (−200 mesh) shows hydrogen desorption peaks at two temperatures 310 and 510 K (see comparative example #3, FIG. 15). After the TPD experiment, the sample was re-activated at 1023 K under vacuum ($1\times10^{-4}$ torr) for one hour and allowed to cool to room temperature before transfer, under helium atmosphere, to a high pressure adsorption testing apparatus. After exposure to vacuum for 10 minutes at room temperature, high-purity (99.999+%) hydrogen was expanded from a known volume into the evacuated sample cell to give an initial hydrogen pressure of ca. 150 psia. The pressure of the system was recorded at intervals of one second, showing a decrease in pressure that corresponds to a rapid hydrogen uptake by the sample.

EXAMPLE 8

Graphite+Nickel

Figure 9:
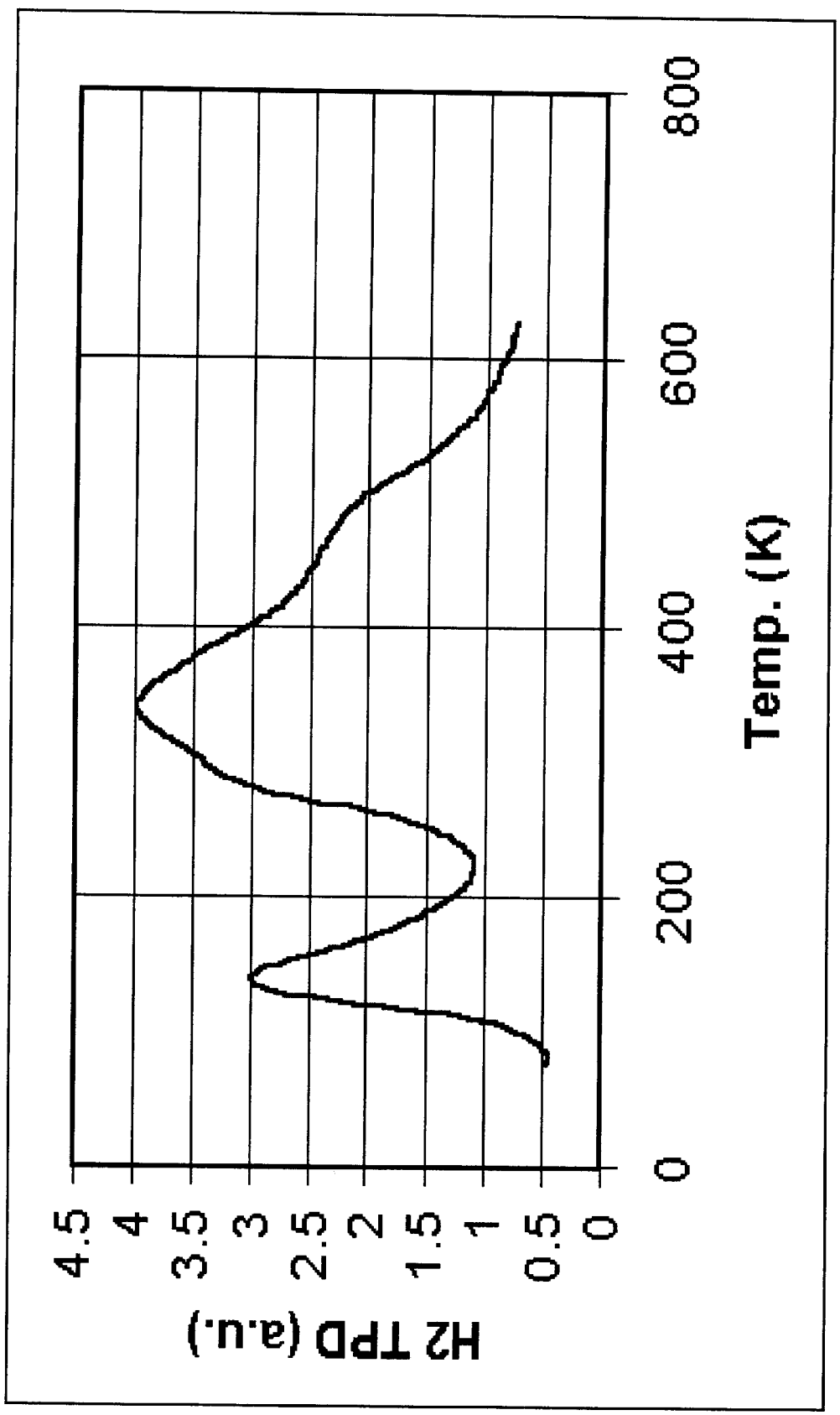
FIG. 9 is a plot of the temperature programmed desorption (TPD) of hydrogen from a sample (Example 8) of a hybrid composition of graphite and nickel metal.

A 1.0 g sample of graphite (Alfa Aesar; 2–15 $\mu$m particle size) and 1.0 g of nickel powder (Acros Organics; −100 mesh) were placed in a 20 cc tungsten carbide grinding vial with four tungsten carbide grinding balls. This mixture was ball milled for 20 hours (model 8000D; Spex, Inc.) at room temperature under argon atmosphere. The sample was removed from the tungsten carbide vial in an argon glovebox and a portion of the sample placed in a quartz cell, of known volume, fitted with a thermocouple that is in direct contact with the sample. The sample was activated at 673 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 10 minutes). A temperature programmed desorption (TPD) experiment was then conducted, using the following procedure: The sample was warmed, at a constant rate, from 77 K to ca. 625 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 9) show the presence of hydrogen desorption in two temperature ranges. A peak for hydrogen adsorption is observed at ca. 77–200 K. This peak is commonly observed for graphite samples which have been ball milled in the absence of metal (see comparative example #5, FIG. 17) and is due to the desorption of hydrogen which is physically adsorbed in microporous sites generated by the mechanical milling. A second set of peaks for hydrogen evolution is observed in the temperature range of 250–500 K. This peak is not observed for either pure (metal-free) milled graphite or nickel powder (see discussion). Two peaks for methane are apparent at 300 and 525 K.

EXAMPLE 9

Graphite+Platinum 1:1

Figure 10:
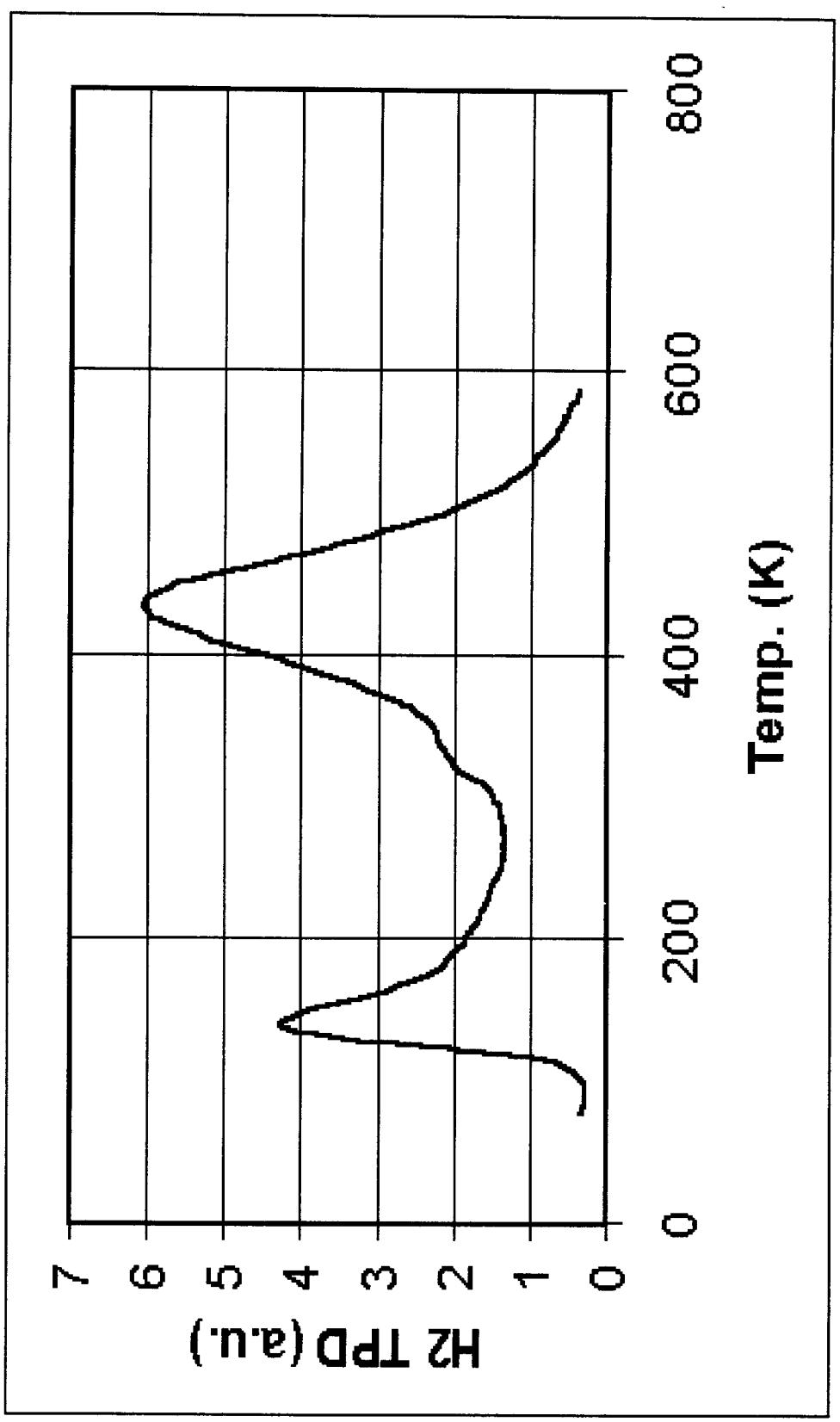
FIG. 10 is a plot of the temperature programmed desorption (TPD) of hydrogen from a sample (Example 9) of a hybrid composition of 1:1 graphite and platinum metal.

A 1.0 g sample of graphite (Aldrich; 1–2 $\mu$m particle size) and 1.0 g of platinum powder (Acros Organics; 0.17–0.4 $\mu$m) were placed in a 20 cc tungsten carbide grinding vial with four tungsten carbide grinding balls. This mixture was ball milled for 24 hours (model 8000D; Spex, Inc.) at room temperature under argon atmosphere. The sample was removed from the tungsten carbide vial in an argon glovebox and a portion of the sample placed in a quartz cell, of known volume, fitted with a thermocouple that is in direct contact with the sample. The sample was activated at 973 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 10 minutes). A temperature programmed desorption (TPD) experiment was then conducted, using the following procedure: The sample was warmed, at a constant rate, from 77 K to ca. 600K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 10) show the presence of hydrogen desorption in two temperature ranges. A peak for hydrogen adsorption is observed at ca. 100–200 K. This peak is commonly observed for graphite samples which have been ball milled in the absence of metal (see comparative example #5, FIG. 17) and is due to the desorption of hydrogen which is physically adsorbed in microporous sites generated by the mechanical milling. A second set of peaks for hydrogen evolution is observed in the temperature range of 300–500 K. Methane is evolved above 500 K.

EXAMPLE 10

Graphite+Palladium

Figure 11:
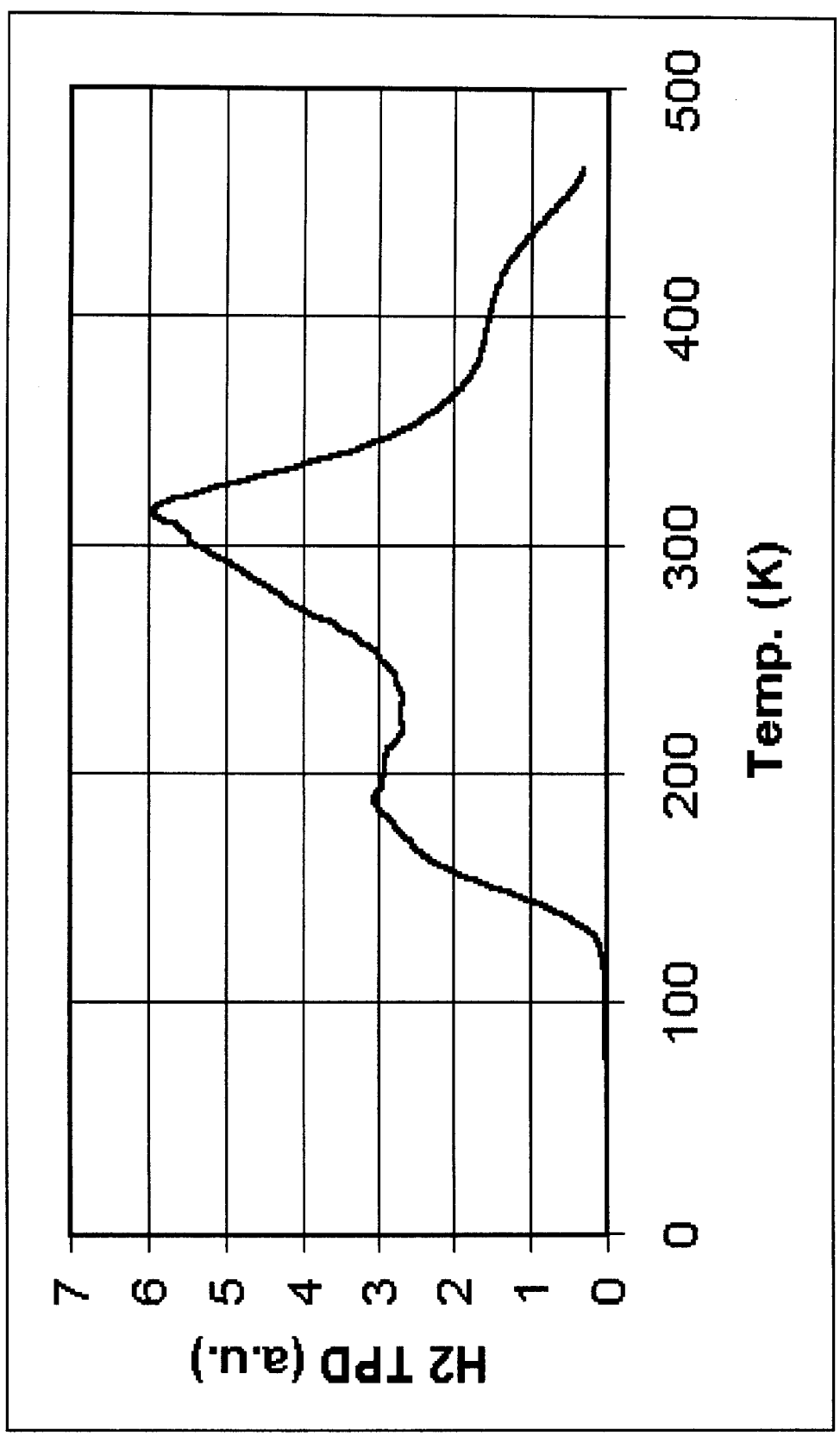
FIG. 11 is a plot of the temperature programmed desorption (TPD) of hydrogen from a sample (Example 10) of a hybrid composition of graphite and palladium metal.
Figure 16:
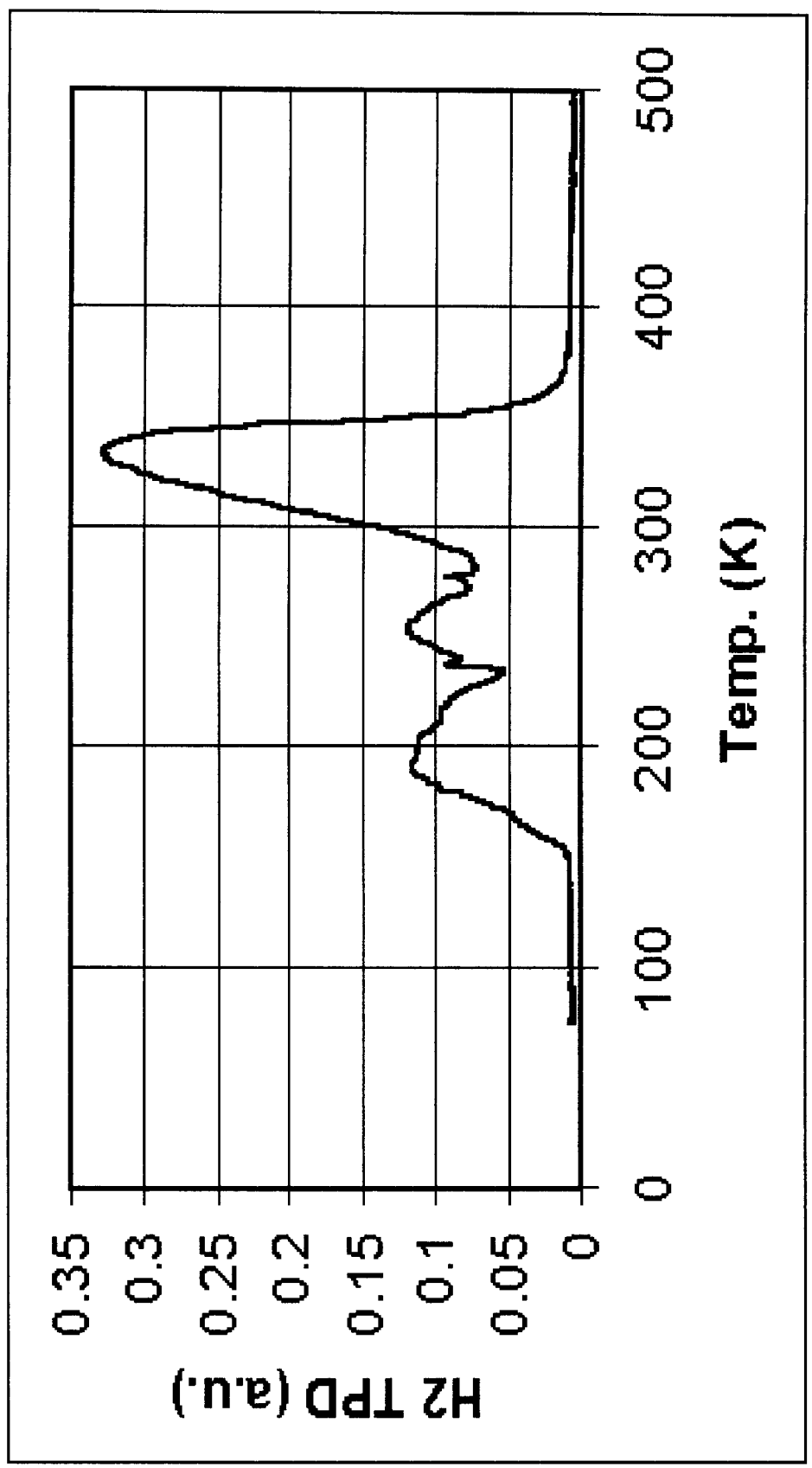
FIG. 16 is a plot of the temperature programmed desorption (TPD) of hydrogen from a sample (Comparative example 4) of palladium metal powder.

A 1.0 g sample of graphite (Aldrich; 1–2 $\mu$m particle size) and 1.0 g of palladium powder (Acros Organics) were placed in a 20 cc tungsten carbide grinding vial with four tungsten carbide grinding balls. This mixture was ball milled for 24 hours (model 8000D; Spex, Inc.) at room temperature under argon atmosphere. The sample was removed from the tungsten carbide vial in an argon glovebox and a portion of the sample placed in a quartz cell, of known volume, fitted with a thermocouple that is in direct contact with the sample. The sample was activated at 500 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 10 minutes). A temperature programmed desorption (TPD) experiment was then conducted, using the following procedure: The sample was warmed, at a constant rate, from 77 K to ca. 475 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 11) show the presence of hydrogen desorption in three temperature ranges. A peak for hydrogen adsorption is observed at ca. 200 K. Another peak for hydrogen evolution is observed in the temperature range of 250–350 K. A third peak for hydrogen evolution is observed at 400 K. The TPD spectrum for pure palladium metal shows peaks at 200, 250, and 330 K (see comparative example #4, FIG. 16). Methane is evolved at 300 and >450 K.

EXAMPLE 11

Graphite+Ruthenium

Figure 12:
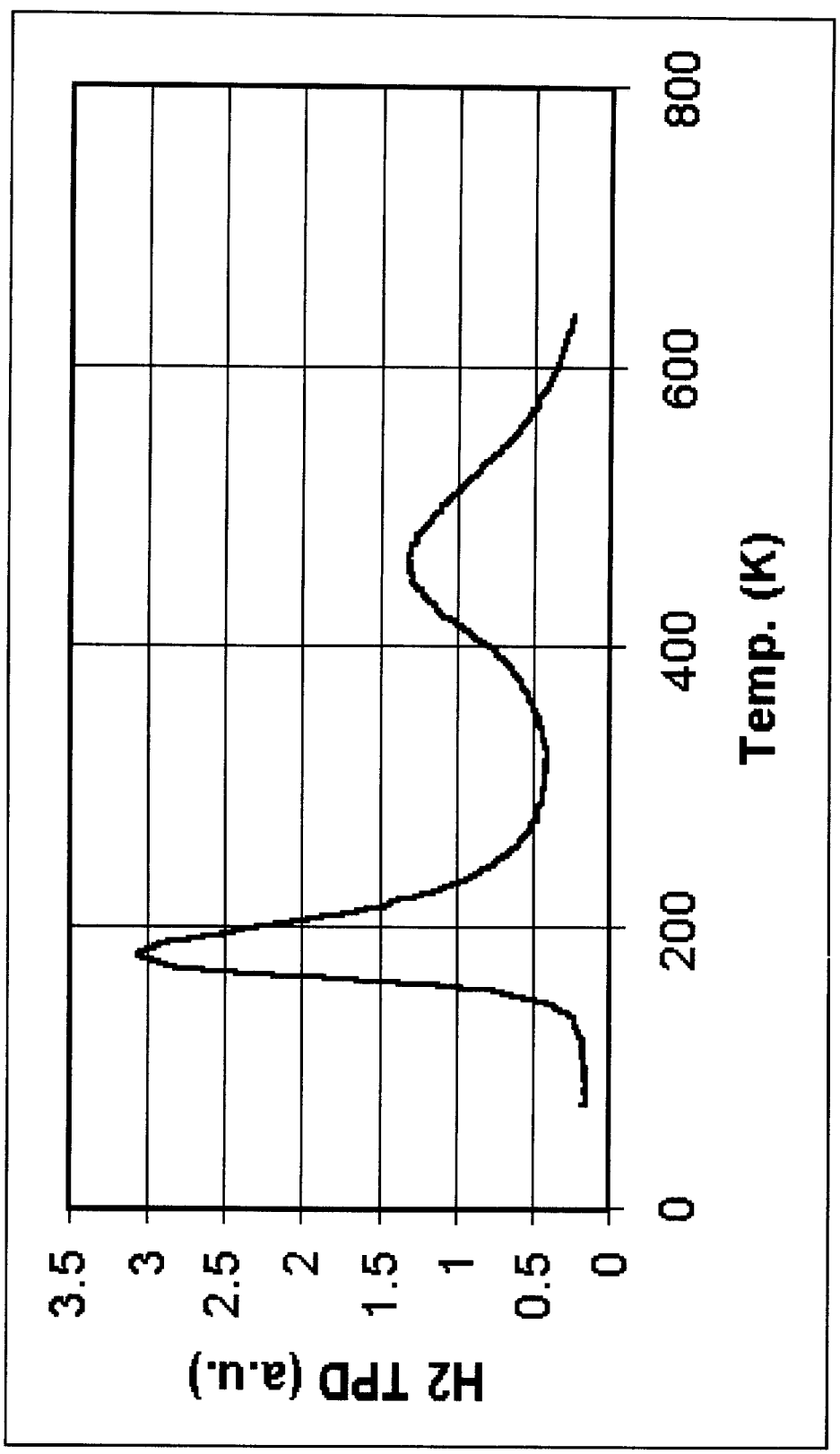
FIG. 12 is a plot of the temperature programmed desorption (TPD) of hydrogen from a sample (Example 11) of a hybrid composition of graphite and ruthenium metal.

A 1.0 g sample of graphite (Aldrich; 1–2 $\mu$m particle size) and 1.0 g of ruthenium powder (Acros Organics; −200 mesh) were placed in a 20 cc tungsten carbide grinding vial with four tungsten carbide grinding balls. This mixture was ball milled for 20 hours (model 8000D; Spex, Inc.) at room temperature under argon atmosphere. The sample was removed from the tungsten carbide vial in an argon glovebox and a portion of the sample placed in a quartz cell, of known volume, fitted with a thermocouple that is in direct contact with the sample. The sample was activated at 500 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 10 minutes). A temperature programmed desorption (TPD)

experiment was then conducted, using the following procedure: The sample was warmed, at a constant rate, from 77 K to ca. 625K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 12) show the presence of hydrogen desorption in two temperature ranges. A peak for hydrogen adsorption is observed at ca. 150 K. This peak is commonly observed for graphite samples which have been ball milled in the absence of metal (see comparative example #5, FIG. 17) and is due to the desorption of hydrogen which is physically adsorbed in microporous sites generated by the mechanical milling. A second set of peaks for hydrogen evolution is observed in the temperature range of 350–450 K.

COMPARATIVE EXAMPLE 1

90Ti—6Al—4V Alloy

A 0.075 g sample of 90Ti/6Al/4V alloy (Cerac, Inc.; −50 mesh) was placed in a quartz cell, of known volume, fitted with a thermocouple that is in direct contact with the sample. At room temperature, high-purity (99.999+%) hydrogen was expanded from a known volume into the evacuated sample cell to give an initial hydrogen pressure of ca. 10 psia. The sample was heated to ca. 750 K to promote the hydriding of the sample, as detected by a decrease in hydrogen pressure. After the system had reached an equilibrium pressure, the cell was cooled to 100 K under the hydrogen atmosphere. While holding the sample at 100 K, the hydrogen was evacuated from the cell (total evacuation time of 5 minutes). A temperature programmed desorption (TPD) experiment was then conducted, using the following procedure: The sample was warmed, at a constant rate, from 100 K to ca. 900K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 13) show the presence of hydrogen desorption only above 500 K. The peaks for hydrogen desorption are observed at 675 and 750 K.

COMPARATIVE EXAMPLE 2

Titanium Powder

A 0.2 g sample of titanium powder (Alfa Aesar; −325 mesh) was placed in a quartz cell, of known volume, fitted with a thermocouple that is in direct contact with the sample. At room temperature, high-purity (99.999+%) hydrogen was expanded from a known volume into the evacuated sample cell to give an initial hydrogen pressure of ca. 10 psia. The sample was heated to ca. 700 K to promote the hydriding of the sample, as detected by a decrease in hydrogen pressure that corresponds to a hydrogen uptake. After the system had reached an equilibrium pressure, the cell was cooled to 298 K under the hydrogen atmosphere. While holding the sample at 298 K, the hydrogen was evacuated from the cell (total evacuation time of 5 minutes). A temperature programmed desorption (TPD) experiment was then conducted, using the following procedure: The sample was warmed, at a constant rate, from 298 K to ca. 800 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 14) show hydrogen desorption only above 600 K. The peak for hydrogen desorption is observed to be >800 K.

COMPARATIVE EXAMPLE 3

Vanadium Powder

A 0.56 g sample of vanadium powder (Acros Organics; −200 mesh) was placed in a quartz cell, of known volume, fitted with a thermocouple that is in direct contact with the sample. The sample was activated at 800 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 5 minutes). A temperature programmed desorption (TPD) experiment was then conducted, using the following procedure: The sample was warmed, at a constant rate, from 77 K to ca. 775 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 15) show two peaks for hydrogen desorption at ca. 300 K and 500 K.

COMPARATIVE EXAMPLE 4

Palladium Powder

A 0.25 g sample of palladium powder (Acros Organics) was placed in a quartz cell, of known volume, fitted with a thermocouple that is in direct contact with the sample. The sample was activated at 500 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The pressure of the system was recorded at intervals of one second, showing a decrease in pressure that corresponds to a rapid hydrogen uptake by the sample. After the system had reached an equilibrium pressure, the cell was cooled to 77 K under the hydrogen atmosphere. While holding the sample at 77 K, the hydrogen was evacuated from the cell (total evacuation time of 5 minutes). A temperature programmed desorption (TPD) experiment was then conducted, using the following procedure: The sample was warmed, at a constant rate, from 77 K to ca. 500 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 16) show three peaks for hydrogen desorption at ca. 200, 250, and 330 K.

COMPARATIVE EXAMPLE 5

Mechanically Milled Graphite Powder

A 2.0 g sample of graphite (Alfa Aesar; −325 mesh) was placed in a 20 cc zirconia grinding vial with four zirconia grinding balls. This sample was ball milled for 6 hours (model 8000D; Spex, Inc.) at room temperature under argon atmosphere. The sample was removed from the zirconia vial in an argon glovebox and a portion of the sample placed in a quartz cell, of known volume, fitted with a thermocouple that is in direct contact with the sample. The sample was activated at 1023 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The cell was slowly cooled to 77 K under the hydrogen atmosphere. While holding the sample at 77 K, the hydrogen was evacuated from the cell (total evacuation time of 15 minutes). A temperature programmed desorption (TPD) experiment was then conducted, using the following procedure: The sample was warmed, at a constant rate, from 77 K to ca. 425 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 17) shows only one peak at ca. 77–150 K for hydrogen desorption from the sample. There was no detectible increase in desorption rate of hydrogen at temperatures above 150 K.

COMPARATIVE EXAMPLE 6

Graphite+Magnesium

Figure 18:
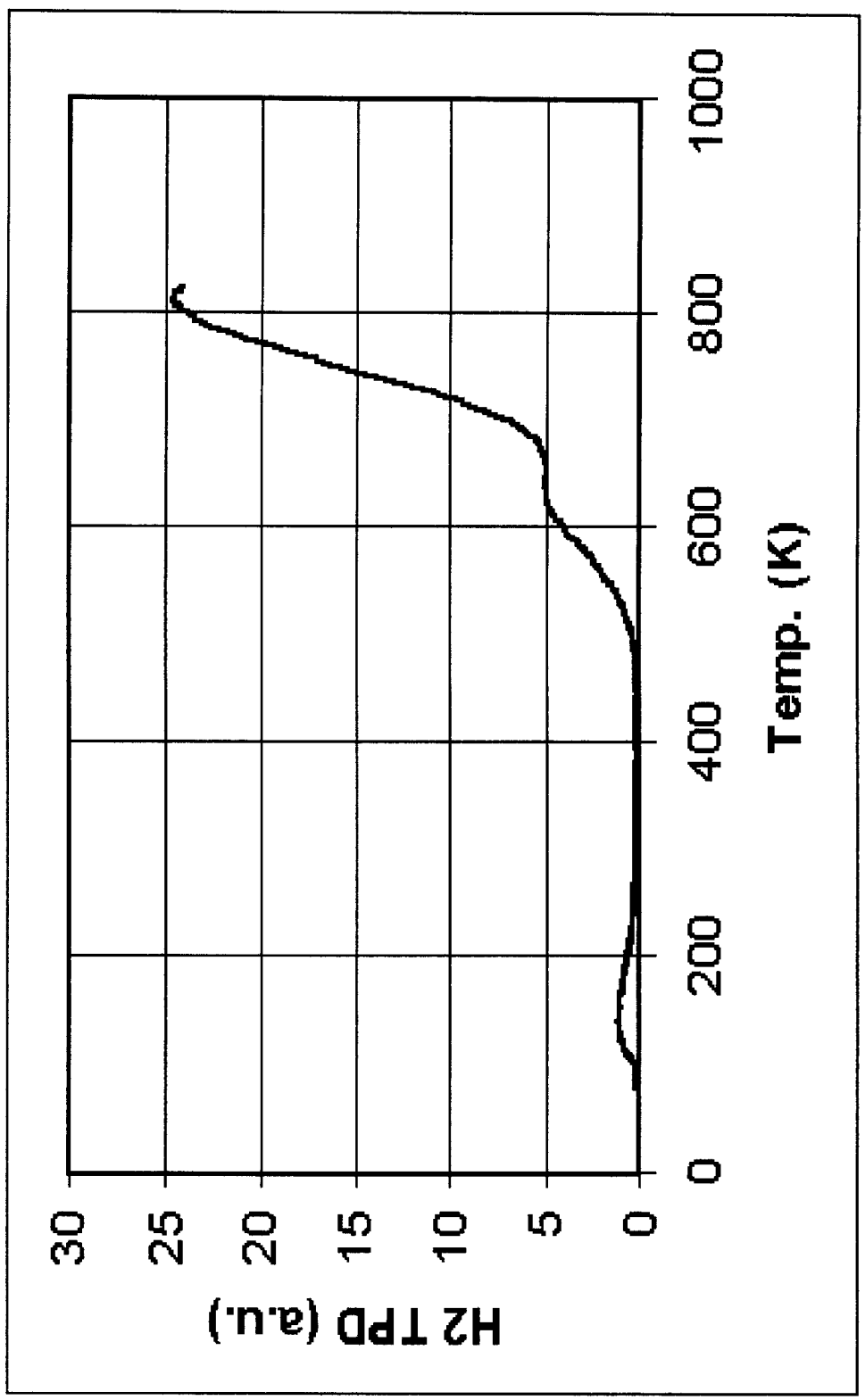
FIG. 18 is a plot of the temperature programmed desorption (TPD) of hydrogen from a sample (Comparative example 6) of a hybrid composition of graphite and magnesium metal.

A 1.0 g sample of graphite powder (Aldrich, 1–2 $\mu$m) and 1.0 g of magnesium metal (Aldrich, −200 mesh) were placed in a 20 cc stainless steel grinding vial with four stainless steel grinding balls. This mixture was ball milled for 20 hours (model 8000D; Spex, Inc.) at room temperature under argon atmosphere. The sample was removed from the stainless steel vial in an argon glovebox and a portion of the sample placed in a quartz cell, of known volume, fitted with a thermocouple that is in direct contact with the sample. The sample was activated at 523 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. The sample was heated to ca. 750 K to promote the hydriding of the sample, as detected by a decrease in hydrogen pressure. After the system had reached an equilibrium pressure, the cell was cooled to 87 K under the hydrogen atmosphere. While holding the sample at 87 K, the hydrogen was evacuated from the cell (total evacuation time of 15 minutes). A temperature programmed desorption (TPD) experiment was then conducted, using the following procedure: The sample was warmed, at a constant rate, from 87 K to ca. 825 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 18) show the presence of hydrogen desorption in two temperature ranges. A low-intensity peak for hydrogen adsorption is observed at ca. 87–200 K. This peak is commonly observed for graphite samples which have been ball milled in the absence of metal (see comparative example #5, FIG. 17) and is due to the desorption of hydrogen which is physically adsorbed in microporous sites generated by the mechanical milling. A second set of peaks for hydrogen evolution is observed at the temperatures of 650 and 820 K. No hydrogen evolution at near-ambient temperatures (250–400 K), as are observed in examples 1–11 (which represent carbon/metal hybrid compositions where the metal constituent is a transition metal) is observed in the present case. Magnesium, an alkaline metal, does not form a useful carbon/metal hybrid composition for hydrogen storage under these conditions of use.

COMPARATIVE EXAMPLE 7

Activated Carbon+Platinum

Figure 19:
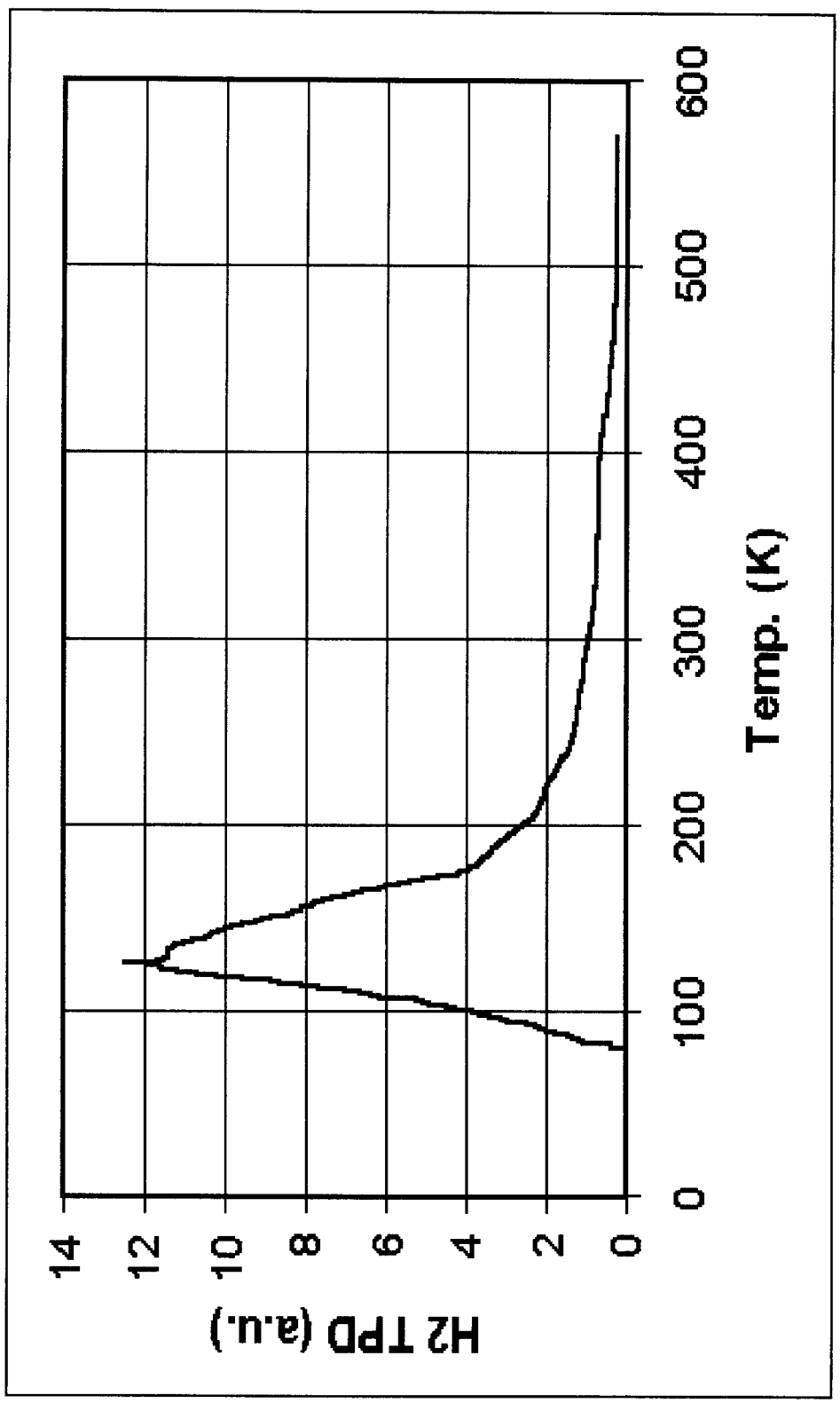
FIG. 19 is a plot of the temperature programmed desorption (TPD) of hydrogen from a sample (Comparative example 7) of 10% platinum metal on activated carbon.

A 1.5 g sample of 10% (w/w) platinum (1 nm metal particle size) on high-surface-area activated carbon was activated at 523 K under vacuum ($1\times10^{-4}$ torr) for one hour and allowed to cool to room temperature. At room temperature, high-purity (99.999+%) hydrogen was expanded from a known volume into the evacuated sample cell to give an initial hydrogen pressure of ca. 10 psia. No hydrogen uptake at ambient temperature was detected. The sample was heated to ca. 525 K to promote the hydriding of the sample, but no detectable hydrogen adsorption was evident at this temperature. After the system was allowed to cool to room temperature, the cell was cooled to 77 K under the hydrogen atmosphere. While holding the sample at 77 K, the hydrogen was evacuated from the cell (total evacuation time of 2 minutes). A temperature programmed desorption (TPD) experiment was then conducted, using the following procedure: The sample was warmed, at a constant rate, from 77 K to ca. 570 K. During this heating, the sample cell was held under a dynamic vacuum from a turbo-molecular pump. Simultaneously, pressure changes in the cell were recorded using a sensitive pressure transducer and a gas-phase hydrogen ion count was recorded using a mass spectrometer (also used to assay for evolution of gases other than hydrogen). The results of the TPD experiment (FIG. 19) show the presence of hydrogen desorption in one temperature range. A peak for hydrogen adsorption is observed at ca. 87–200 K. This peak is due to the desorption of hydrogen which is physically adsorbed in microporous sites in the activated carbon. No hydrogen desorption peaks at near-ambient temperatures (250–400 K), as are observed in examples 1–11 (which represent carbon/metal hybrid compositions where the metal constituent is a transition metal) is observed in the present case. The activated carbon in the present sample does not have a substantially graphitic structure (graphitic structure: a conjugated, unsaturated aromatic) nor does it exhibit a [002] reflection in the x-ray powder diffraction pattern.

Discussion of Examples

Five graphitic carbons have been intimately combined with small particles of 90Ti/6Al/4V alloy using ultrasonication and ball milling techniques. In examples 1–5, temperature programmed desorption (TPD) shows the desorption of adsorbed hydrogen from these mixtures in the temperature range of 250–400 K. As shown in comparative example 1, similar exposures to hydrogen and subsequent temperature programmed desorption on pure 90Ti/6Al/4V alloy shows hydrogen desorption only above 500 K, which is unsuitable for the energy efficient storage of hydrogen. In comparative example 5, a sample of mechanically milled graphite shows hydrogen desorption during TPD only below 150 K, which is also unsuitable for the efficient storage of hydrogen due to the need for energy-intensive cryogenic or refrigeration systems.

Example 6 demonstrates a similar effect with pure titanium metal. TPD shows desorption of hydrogen from a graphite nanofiber/titanium sample at ca. 300 K. In comparative example 2, the TPD of hydrogen from hydrided titanium metal ($TiH_x$) occurs above 600 K, with maximum desorption rates occuring at >750 K.

Example 7 and 7(a) demonstrate that a hybrid composition of graphitic carbon and vanadium metal can adsorb hydrogen at 9.7 and 147 psia, respectively, and desorb hydrogen at temperatures between 250 K and 600 K. In comparative example 3, the TPD of hydrogen from hydrided vanadium metal ($VH_x$) occurs at two different temperatures under vacuum, 310 and 510 K.

Example 8 demonstrates that a hybrid composition of graphitic carbon and nickel metal can adsorb hydrogen (0.18 mmol/g) rapidly at ambient temperatures and hydrogen pressures of less than 15 psia. The desorption of hydrogen, during TPD, occurs at 350 K. The literature on hydrogen adsorption by carbon-supported nickel teaches that high temperatures have typically been necessary to see uptake of hydrogen of this magnitude. For example, a sample of 10% Ni on activated carbon adsorbs 0.09 mmol/g of hydrogen in less than 10 minutes, but only at the high temperature of 673 K, and the TPD of hydrogen from this Ni/C sample shows hydrogen desorption starting at 500 K and peaking at 900 K (Fujimoto, K.; Toyoshi, S. *Stud. Surf. Sci. Catal.* (1981) 7, 235). These temperatures are substantially higher than the desorption temperature of ca. 350 K in the present invention and much less suitable for hydrogen storage.

Example 9 demonstrates that a hybrid composition of graphitic carbon and platinum metal can adsorb hydrogen (0.35 mmol/g) rapidly at ambient temperature and a hydrogen pressure of less than 15 psia. The desorption of hydrogen, during TPD, occurs at 350–400 K. The literature on hydrogen adsorption by carbon-supported platinum teaches that high temperatures have been used to see uptakes of hydrogen. Platinum (0.2–1%) on carbon black adsorbs 0.06 mmol/g hydrogen at the elevated temperature of 623 K and 11.6 psia $H_2$ pressure over 60 minutes (Robell, A. J.; Ballou, E. V.; Boudart, M. *J. Phys. Chem.* (1964) 68, 2748). Carbon-supported platinum (10% w/w) is reported to adsorb 0.06 mmol/g hydrogen at 294 K and 14.7 psia $H_2$ pressure (Hunt, C. E. *J. Catalysis* (1971) 23, 93).

Example 10 demonstrates that a hybrid composition of graphitic carbon and palladium metal can adsorb hydrogen (0.55 mmol/g) rapidly at ambient temperatures and hydrogen pressures of less than 15 psia. The desorption of hydrogen, during TPD, occurs at 150–400 K. The literature on hydrogen adsorption by carbon-supported palladium teaches that high temperatures have been used to see substantial uptakes of hydrogen. Palladium (5% w/w) on carbon adsorbs 0.24 mmol/g hydrogen in <1 hour at 423 K and 1.9 psia hydrogen pressure (Suzuki, S.; Suzuki, T. *Bull. Chem. Soc. Japan* (1965) 38, 2020). Palladium (5% w/w) on carbon adsorbs 0.03 mmol/g hydrogen, a far smaller amount than the present invention, at 294 K and 14.7 psia hydrogen pressure (Hunt, C. E. *J. Catalysis* (1971) 23, 93).

Example 11 demonstrates that a hybrid composition of graphitic carbon and ruthenium metal can adsorb hydrogen (0.10 mmol/g) rapidly at ambient temperatures and hydrogen pressures of less than 15 psia. The desorption of hydrogen, during TPD, occurs at 400–500 K. The literature on hydrogen adsorption by carbon-supported ruthenium teaches that very small quantities of hydrogen have previously been adsorbed at ambient temperature. Ruthenium (1% w/w) on high-surface-area graphite adsorbs only 0.009 mmol/g hydrogen at 298 K and an undisclosed hydrogen pressure and the TPD of hydrogen from this sample gives rise to peaks at ca. 400 and 600 K [Badenes, P.; Daza, L.; Rodriguez-Ramos, I.; Guerrero-Ruiz, A. in Spillover and Migration of Surface Species on Catalysts (C. Li, Q. Xin, eds.) p. 241 (1997)].

| Example # | Carbon/Metal | $H_2$ Pressure (psia) | $H_2$ Uptake (mmol/g) | Time (min.) |
|---|---|---|---|---|
| 1 | Exfoliated graphite/90Ti-6Al-4V | 9.7 | 1.5 | 4.0 |
| 2 | Mesoporous carbon/90T1-6Al-4V | 9.7 | 5.7 | 2.3 |
| 3 | MWNT/90Ti-6Al-4V | 9.7 | 3.9 | 5.9 |
| 4 | Graphite nanofibers/90Ti-6Al-4V | 9.7 | 0.43 | 5.0 |
| 5 | Graphite/90Ti-6Al-4V | 9.7 | 0.13 | 7.7 |
| 6 | Graphite nanofibers/Titanium | 9.7 | 0.13 | 3.8 |
| 7 | Graphite nanofibers/Vanadium | 9.7 | 0.23 | 100.5 |
| 7 (a) | Graphite nanofibers/Vanadium | 147 | 0.88 | 37.2 |
| 8 | Graphite/Nickel | 9.7 | 0.18 | 5.6 |
| 9 | Graphite/Platinum | 9.7 | 0.35 | 6.3 |
| 10 | Graphite/Palladium | 9.7 | 0.55 | 1.8 |
| 11 | Graphite/Ruthenium | 9.7 | 0.10 | 7.3 |

What is claimed is:

1. A process for reversibly sorbing hydrogen gas comprising bringing a hydrogen-containing gas into contact with a carbon-metal hybrid material under conditions of temperature and partial pressure of hydrogen whereby the carbon-metal hybrid material sorbs said hydrogen gas, and subsequently adjusting the temperature and/or pressure to cause desorption of said hydrogen gas from the carbon-metal hybrid material; said process characterized in that the carbon-metal hybrid material comprises a substantially graphitic carbon component and a metal or metal alloy component which reversibly reacts with the hydrogen, wherein the said metal or metal alloy components of the carbon-metal hybrid material has been reacted with hydrogen to form a metal hydride prior to combination with the substantially graphitic carbon component to form the carbon-metal hybrid.

2. A process in accordance with claim 1 wherein said substantially graphitic carbon component of the carbon-metal hybrid material is selected from the group consisting of graphite, exfoliated graphite, single wall carbon nanotubes, single wall carbon nanocones, carbon nanocells, multi-wall carbon nanotubes, carbon nanofilm, mesoporous and microporous carbon microbeads, substantially graphitized carbon soot, and mixtures thereof.

3. A process in accordance with claim 2 wherein said substantially graphitic carbon component of the carbon-metal hybrid material is a single-sheet graphitic structure.

4. A process in accordance with claim 1 wherein said metal component of the carbon-metal hybrid material is a metal or an alloy containing a metal selected from the group consisting of Pt, Pd, Ir, Rh, Ru, Os, Ni, Co, Ti, Zr, Hf, V, Nb, Ta, and mixtures thereof.

5. A process in accordance with claim 1 wherein the hydrogen-containing gas is brought into contact with said carbon-metal hybrid material in a vessel at a pressure from between 14 psia to 2000 psia of hydrogen partial pressure whereby said hybrid material sorbs said hydrogen gas, and the pressure in the vessel is subsequently reduced without adjusting the temperature, thereby desorbing the hydrogen gas from the carbon-metal hybrid material.

6. A process in accordance with claim 5 wherein said pressure in the vessel is reduced to about 1 psia to 200 psia to desorb said hydrogen gas.

7. A process in accordance with claim 1 wherein the hydrogen-containing gas is brought into contact with said carbon-metal hybrid material in a vessel at a temperature from between 253 K to 473 K whereby said hybrid material sorbs said hydrogen gas, and the temperature in the vessel is subsequently increased without adjusting the pressure, thereby desorbing the hydrogen gas from the carbon-metal hybrid material.

8. A process in accordance with claim 7 wherein said temperature in the vessel is increased to about 273 K to 573 K to desorb said hydrogen gas.

9. A process in accordance with claim 1 wherein said hydrogen-containing gas is contacted with said carbon-metal hybrid material for about 0.5 to 120 minutes.

10. A process in accordance with claim 1 wherein said carbon-metal hybrid material can store between 0.1 and 10 wt % hydrogen at ambient or near-ambient conditions of temperature and pressure.

11. A process in accordance with claim 1 wherein said carbon-metal hybrid material contains a bulk concentration of metal or metal alloy, which comprises from 1 to 80% on a weight basis of the carbon-metal hybrid material.

12. A process for reversibly storing hydrogen using a carbon-metal hybrid material, which hybrid material comprises a substantially graphitic carbon component and a metal or metal alloy component capable of reversibly reacting with hydrogen, said process comprising bringing a hydrogen-containing gas into contact with said carbon-metal hybrid material within a storage vessel at a hydrogen partial pressure from about 20 psia to 500 psia and a temperature from about 253 K to 473 K whereby said carbon-metal hybrid material sorbs, thereby storing said hydrogen gas, and subsequently reducing the hydrogen partial pressure to between about 1 psia to 200 psia and increasing the temperature to between about 273 K to 573 K to desorb said hydrogen gas from said carbon-metal hybrid material.

13. A process in accordance with claim 12 wherein after said carbon-metal hybrid material sorbs said hydrogen, the hydrogen partial pressure is reduced to between 14 psia to 50 psia and the temperature is increased to between about 293 K to 363 K to desorb the hydrogen gas from the carbon-metal hybrid material.

14. A process in accordance with claim 12 wherein said substantially graphitic carbon component of the carbon-metal hybrid material is selected from the group consisting of graphite, exfoliated graphite, single wall carbon nanotubes, single wall carbon nanocones, carbon nanocells, multi-wall carbon nanotubes, carbon nanofilm, mesoporous and microporous carbon microbeads, substantially graphitized carbon soot, and mixtures thereof.

15. A process in accordance with claim 12 wherein said metal component of the carbon-metal hybrid material is a metal or an alloy containing a metal selected from the group consisting of Pt, Pd, Ir, Rh, Ru, Os, Ni, Co, Ti, Zr, Hf, V, Nb, Ta, and mixtures thereof.

16. A process in accordance with claim 12 wherein said hydrogen can be stored within said carbon-metal hybrid material for an indefinite period of time before it is desorbed.

17. A process in accordance with claim 16 wherein said carbon-metal hybrid material stores between 0.1 and 10 wt % hydrogen at ambient conditions.

18. A process in accordance with claim 12 wherein the hydrogen stored in the carbon-metal hybrid material can be desorbed and recovered on demand by adjusting conditions of temperature and/or pressure to provide a readily available supply of hydrogen.

* * * * *